United States Patent [19]

Noi et al.

[11] Patent Number: 4,897,219

[45] Date of Patent: Jan. 30, 1990

[54] VOLTAGE-DEPENDENT NON-LINEAR RESISTANCE CERAMIC COMPOSITION

[75] Inventors: Keiichi Noi, Tsuzuki; Akihiro Takami; Kazuhide Ebine, both of Katano; Kimiko Kumazawa, Ikoma, all of Japan

[73] Assignee: Matsushita Electric Industrial Co., Ltd., Kadoma, Japan

[21] Appl. No.: 268,618

[22] Filed: Nov. 7, 1988

Related U.S. Application Data

[63] Continuation of Ser. No. 21,588, Mar. 2, 1987, abandoned, which is a continuation of Ser. No. 668,383, Oct. 9, 1984, abandoned.

[30] Foreign Application Priority Data

| Feb. 10, 1983 | [JP] | Japan | 58-20657 |
|---|---|---|---|
| Feb. 10, 1983 | [JP] | Japan | 58-20608 |
| Feb. 10, 1983 | [JP] | Japan | 58-20609 |
| Feb. 10, 1983 | [JP] | Japan | 58-20610 |
| Feb. 10, 1983 | [JP] | Japan | 58-20653 |
| Feb. 10, 1983 | [JP] | Japan | 58-20654 |
| Feb. 10, 1983 | [JP] | Japan | 58-20655 |
| Feb. 10, 1983 | [JP] | Japan | 58-20656 |
| Feb. 15, 1983 | [JP] | Japan | 58-24029 |
| Feb. 15, 1983 | [JP] | Japan | 58-24028 |
| Apr. 28, 1983 | [JP] | Japan | 58-75749 |
| Apr. 28, 1983 | [JP] | Japan | 58-75748 |
| May 2, 1983 | [JP] | Japan | 58-77757 |
| May 2, 1983 | [JP] | Japan | 58-77753 |
| May 2, 1983 | [JP] | Japan | 58-77754 |
| May 13, 1983 | [JP] | Japan | 58-84426 |
| May 13, 1983 | [JP] | Japan | 58-84422 |
| May 13, 1983 | [JP] | Japan | 58-84423 |
| May 13, 1983 | [JP] | Japan | 58-84424 |
| May 13, 1983 | [JP] | Japan | 58-84425 |
| Feb. 9, 1984 | [WO] | World Int. Prop. O. | PCT/JP84/00035 |

[51] Int. Cl.$^4$ .................. H01B 1/08; C03C 35/46
[52] U.S. Cl. .................. 252/520; 252/521; 501/136; 501/137; 501/138; 501/139
[58] Field of Search .............. 501/136, 137, 138, 139; 252/520, 521

[56] References Cited

U.S. PATENT DOCUMENTS

| 3,268,783 | 8/1966 | Saburi | 501/139 X |
|---|---|---|---|
| 4,403,236 | 9/1983 | Mandai et al. | 252/520 X |

FOREIGN PATENT DOCUMENTS

| A170540 | 1/1983 | European Pat. Off. | |
| 0010596 | 1/1977 | Japan | 501/136 |
| 0058700 | 5/1978 | Japan | 501/136 |
| 0065999 | 6/1978 | Japan | 252/520 |
| 57-35303 | 2/1982 | Japan | |
| 58-16504 | 1/1983 | Japan | |
| 58-42220 | 3/1983 | Japan | |
| 58-135604 | 8/1983 | Japan | |

*Primary Examiner*—William R. Dixon, Jr.
*Assistant Examiner*—Karl Group
*Attorney, Agent, or Firm*—Cushman, Darby & Cushman

[57] ABSTRACT

It is a voltage-dependent non-linear resistance ceramic composition comprising $SrTiO_3$ as host material, $Dy_2O_3$ or $Dy_2O_3$ and $Nb_2O_5$ or $Ta_2O_5$ or $Ta_2O_5$ and $Nb_2O_5$ as accelerating agent for semiconductorization, thereby changing crystal to a low resistance, and changing crystal boundary to a high resistance.

In case $Dy_2O_3$ or $Dy_2O_3$ and $Nb_2O_5$ are used as the accelerating agent for semiconductorization, one kind or more selected from the group consisting of Na, K, Ca, Cd, In, Ba, Pb, Ag, Ce, La, Sc, Y, Cs, Au, Mg, Zr, Sn, Sb, W, Bi, Ni, Fe, Ga, Pt, Tl, Al, Si, Be, Li, Eu, Gd, Tb, Tm, Lu, Th, Ir, Os, Hf and Ru. Alternatively, in case $Ta_2O_5$ or $Ta_2O_5$ and $Nb_2O_5$ are used as the accelerating agent for semiconductorization, one kind or more selected from the group consisting of Na, K, Ca, Cd, In, Ba, Pb, Mg, Zr, Sn, Sb, W, Bi, Eu, Gd, Tb, Tm, Lu, Th, Ir, Os, Hf, Ru, Ga, Pt, Tl, La, Sc, Y, Cs, and Au.

As a result, baristor characteristic is obtainable by means of the high resistance at crystal boundaries and capacitor between crystal granules—crystal boundary—crystal granule.

From this matter, an element having both functions of the baristor characteristics and the capacitor characteristics are obtainable, and performs effect in surge absorption and noise elimination.

2 Claims, 2 Drawing Sheets

VOLTAGE-DEPENDENT NON-LINEAR RESISTANCE CERAMIC COMPOSITION

This application is a continuation of application Ser. No. 07/021,588, filed Mar. 2, 1987, now abandoned, which was a continuation of application Ser. No. 06/668,383 filed Oct. 9, 1984, abandoned.

TECHNICAL FIELD

The present invention relates to a voltage dependent non-linear resistance ceramic composition for use in surge absorbing and noise elimination in various electric apparatuses and electronic apparatuses.

BACKGROUND ART

Heretofore, in various electric apparatuses and electronic apparatuses, in order to absorb extraordinary high voltage, elimination of noise, elimination of arc, and the like, SiC baristors or varistors of ZnO system having a voltage-dependent non-linear resistance characteristics are used. Voltage-current characteristic of such baristors can be approximately represented by the following equation:

$$I=(V/C)^{\alpha},$$

wherein I is current, V is voltage, C is a constant proper for the baristor, and $\alpha$ is a voltage non-linearity exponent.

The $\alpha$ of the SiC baristor is about 2–7, and for the ZnO system baristor there is ones that reaching 50. Though such baristors has superior characteristic for absorbing relatively high voltage called surge, for voltages lower than baristor voltage (for instance, absorption of noise) almost no effect is represented since its dielectric constant is low and its inherent capacitance is small, and their dielectric loss angle tan $\delta$ are so large as 5–10%.

On the other hand, for elimination of low voltage noise, static electricity, or the like, by appropriately selecting composition and firing condition, semiconductor ceramic capacitors having apparent dielectric constant of about $5 \times 10^4$–$6 \times 10^4$ and tan $\delta$ of about 1% are utilized.

However, these semiconductor ceramic capacitor is liable to be destroyed or become to be non-functional as capacitors when extraordinary high voltage such as surge is impressed thereon or a current above a certain limit is impressed on the element. For such reason, in the electric apparatuses or electronic apparatuses, for the purpose of both the absorbing of high voltage surge and the elimination of low voltage noise, the baristors are used being combined with capacitors and other component (for instance, coil), and for instance, a noise filter has such configuration.

Figure 1:
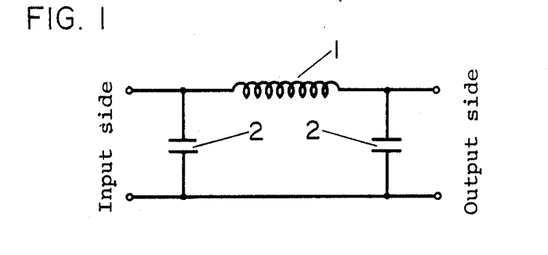
FIG. 1 is a circuit diagram of a general noise filter.
Figure 2:
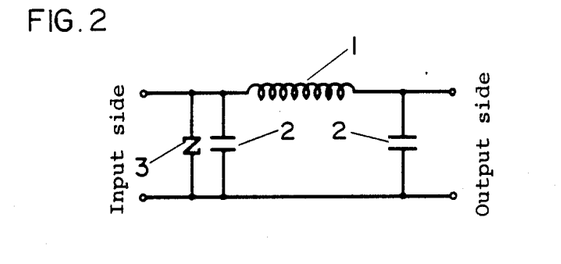
FIG. 2 is a circuit diagram of a noise filter using the conventional baristors and the capacitors.

FIG. 1 shows general noise filter circuit, FIG. 2 shows conventional noise filter circuit constituted by combining a baristor, capacitors and a coil, and 1 is the coil, 2 are the capacitors and 3 is the baristor.

Figure 5:
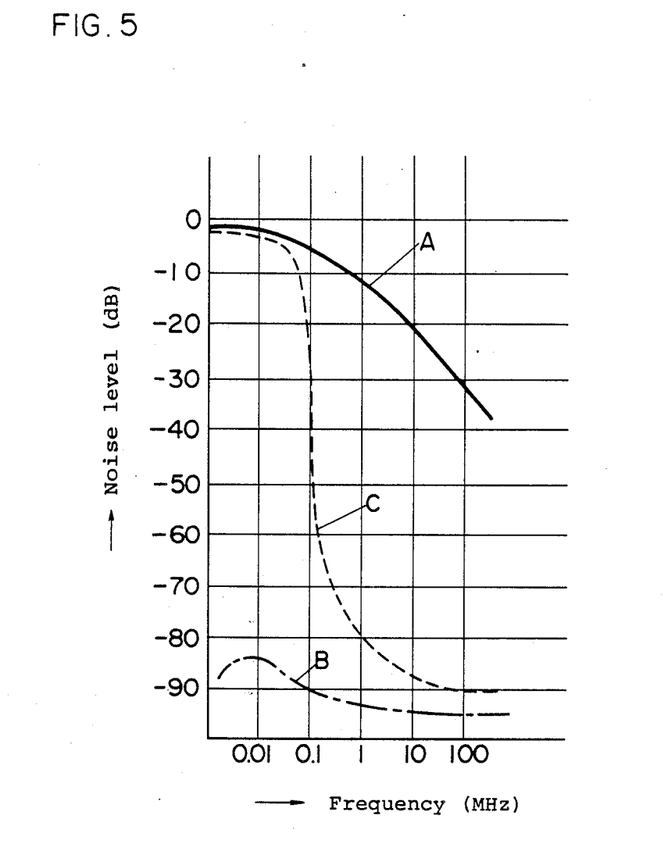
FIG. 5 is a characteristic chart showing situation of input noise and output in accordance with circuit of noise filters of the present invention and the prior art.

When a noise input A shown in FIG. 5 is impressed on these circuits, output characteristic from general noise filter circuit of FIG. 1 is such as C of FIG. 5, and noise is not eliminated sufficiently. Output characteristic from the conventional noise filter circuit including a baristor shown in FIG. 2 is such as B of FIG. 5, and though noise is eliminated, such configuration has a shortcoming that it has large number of components in the inside of the apparatus and besides is contrary to tendency of miniaturization of the apparatus.

Accordingly, an electronic component, which absorbs extraordinary high voltage, can eliminate low voltage, such as noise and has small number of components, and capable of miniaturization, is demanded.

DISCLOSURE OF THE INVENTION

Accordingly, the present invention intends to provide a voltage-dependent non-linear resistance ceramic composition comprising 80.000–99.990 mol % of $SrTiO_3$ and as metal oxide for semiconductorization acceleration 0.005–10.000 mol % of $Dy_2O_3$ or the above-mentioned amount of $Dy_2O_3$ and 0.001–0.200 mol % of $Nb_2O_5$, and is characterized by containing 0.005–10.000 mol % in the form of oxide of at least one kind of element selected from the group consisting of K, Ca, Cd, In, Ba, Cs, Zr, Sn, W, Ni, Fe, Pt, Tl, Si, Be, Li, Ir, Os, Hf and Ru, which segregates at grain boundary to make the grain boundary to high resistance.

Furthermore, the present invention intends to provide a voltage-dependent non-linear resistance ceramic composition comprising 80.000–99.990 mol % of $SrTiO_3$ and as metal oxide for semiconductorization acceleration 0.005–10.000 mol % of $Ta_2O_5$ or the above-mentioned amount of $Ta_2O_5$ and 0.001–0.200 mol % of $Nb_2O_5$, and is characterized by containing 0.005–10.000 mol % in the form of oxide of at least one kind of element selected from the group consisting of Ca, Cd, In, Ba, Sn, Sb, W, Eu, Gd, Tb, Tm, Lu, Th, Ir, Os, Hf, Ru, Pt, Tl, La, Y, Cs and which segregates at grain boundry to make the grain boundary to a high resistance.

The present invention can also provide a voltage-dependent non-linear resistance ceramic composition comprising 79.800–99.989 mol % of $SrTiO_3$ and as metal oxide for semiconductorization acceleration 0.005–10.000 mol % of $Dy_2O_3$, 0.001–0.200 mol % of $Nb_2O_5$, and is characterized by containing 0.005–10.00 mol % in the form of oxide(s) of one or more element selected from the group consisting of Ca, Cd, In, Ba, Cs, Zr, Sn, W, Ni, Fe, Pt, Tl, Si, Be, Li, Ir, Os, Hf, and Ru, which segregates at grain boundary to make the grain boundary to high resistance.

The present invention can also provide a voltage-dependent non-linear resistance ceramic composition comprising 78.000–99.989 mol % of $SrTiO_3$ and as metal oxide for semiconductorization acceleration 0.005–10.000 mol % of $Ta_2O_5$, 0.001–0.200 mol % of $Nb_2O_5$, and is characterized by containing 0.005–10.000 mol % in the form of oxide(s) of one or more element selected from the group consisting of Ca, Cd, In, Ba, Sn, Sb, W, La, Y, Cs, Eu, Gd, Tb, Tm, Lu, Th, Ir, Os, Hf and Ru, which segregates at grain boundary to make the grain boundary to high resistance.

THE BEST MODE FOR EMBODYING THE INVENTION

As a result of accumulating various experiments the inventors propose a voltage dependent non-linear resistance ceramic composition in a different system from the conventional composition by making strontium-titanate ($SrTiO_3$) as host material, and adding either one of $Dy_2O_3$ or $Ta_2O_5$ as semiconductorization accelerating agent, and by further adding depending on necessity appropriate amount of additives; hereafter the present invention is described with respect to embodiments.

EXAMPLE 1

After measuring $SrTiO_3$ and $Dy_2O_3$ and BaO to become composition ratio as shown in the below-mentioned Table 1, they are blended for 6 hours in wet method in a ball-mill or the like, and after drying is calcinated for 1–5 hours at 1000°–1250° C. in the air. Thereafter, after grinding for 4 hours in wet method in ball mill or the like and subsequently drying, and after granulating by adding 8 wt % of organic binder (for instance, polovinylalcohol), press-forming to the size of 8.0 (mm)$\phi$×1.0 (mm) t with a pressing force of 1.0 t/cm². The granulated body is fired in a reducing admosphere (for instance, $N_2:H_2=10:1$) at 1300°–1450° C. for 1–6 hours. The fired body thus obtained has a specific resistance of 0.1–0.8 Ω.cm, and average granular size is 20–50μm. Then, the fired body is further fired in air at 1000°–1300° C. for 0.5–5 hours, to obtain fired body 4 of FIG. 3. Furthermore, the both faces of the fired body 4 are ground with abrasive such as SiC. Diameter of the above-mentioned electrodes 5, 6 are selected to be 5.0 (mm) $\phi$.

Characteristics of the element thus obtained are shown in TABLE 1.

TABLE 1

| Sample No. | Composition ratio (mol %) | | | Characteristics | | | |
|---|---|---|---|---|---|---|---|
| | $SrTiO_3$ | $Dy_2O_3$ | BaO | $V_1mA$ (V/mm) | α | ε | tan δ (%) |
| 1* | 99.995 | 0 | 0.005 | 98 | 1.0 | $4.0 \times 10^3$ | 41.6 |
| 2* | 99.800 | 0 | 0.200 | 86 | 1.7 | $4.0 \times 10^3$ | 33.7 |
| 3* | 99.000 | 0 | 1.000 | 82 | 2.0 | $5.0 \times 10^3$ | 31.9 |
| 4* | 90.000 | 0 | 10.000 | 65 | 2.9 | $8.0 \times 10^3$ | 24.7 |
| 5* | 99.995 | 0.005 | 0 | 39 | 3.2 | $6.0 \times 10^3$ | 9.6 |
| 6 | 99.990 | 0.005 | 0.005 | 68 | 6.4 | $1.0 \times 10^4$ | 5.4 |
| 7 | 99.795 | 0.005 | 0.200 | 59 | 9.1 | $1.8 \times 10^4$ | 3.3 |
| 8 | 98.995 | 0.005 | 1.000 | 43 | 17.7 | $2.0 \times 10^4$ | 2.7 |
| 9 | 89.995 | 0.005 | 10.000 | 30 | 18.0 | $2.5 \times 10^4$ | 3.5 |
| 10* | 84.995 | 0.005 | 15.000 | 26 | 11.5 | $2.6 \times 10^4$ | 8.8 |
| 11* | 99.800 | 0.200 | 0 | 16 | 5.1 | $8.0 \times 10^3$ | 6.1 |
| 12 | 99.795 | 0.200 | 0.005 | 53 | 17.7 | $1.7 \times 10^4$ | 3.4 |
| 13 | 99.600 | 0.200 | 0.200 | 45 | 18.7 | $2.4 \times 10^4$ | 2.3 |
| 14 | 98.800 | 0.200 | 1.000 | 31 | 21.3 | $2.9 \times 10^4$ | 2.5 |
| 15 | 89.800 | 0.200 | 10.000 | 23 | 23.4 | $3.6 \times 10^4$ | 3.2 |
| 16* | 84.800 | 0.200 | 15.000 | 22 | 20.5 | $3.7 \times 10^4$ | 11.1 |
| 17* | 99.000 | 0.200 | 0 | 13 | 6.0 | $9.0 \times 10^3$ | 8.0 |
| 18 | 98.995 | 1.000 | 0.005 | 40 | 13.2 | $1.4 \times 10^4$ | 2.8 |
| 19 | 98.800 | 1.000 | 0.200 | 32 | 18.2 | $2.6 \times 10^4$ | 2.3 |
| 20 | 98.000 | 1.000 | 1.000 | 19 | 21.8 | $3.1 \times 10^4$ | 2.1 |
| 21 | 89.000 | 1.000 | 10.000 | 15 | 20.2 | $3.8 \times 10^4$ | 3.1 |
| 22* | 84.000 | 1.000 | 15.000 | 16 | 20.1 | $4.2 \times 10^4$ | 9.4 |
| 23* | 90.000 | 10.000 | 0 | 21 | 6.4 | $5.0 \times 10^3$ | 9.4 |
| 24 | 89.995 | 10.000 | 0.005 | 34 | 15.4 | $1.8 \times 10^4$ | 3.1 |
| 25 | 89.800 | 10.000 | 0.200 | 29 | 22.0 | $2.2 \times 10^4$ | 2.2 |
| 26 | 89.000 | 10.000 | 1.000 | 18 | 23.8 | $2.6 \times 10^4$ | 2.4 |
| 27 | 80.000 | 10.000 | 10.000 | 10 | 17.7 | $1.9 \times 10^4$ | 3.5 |
| 28* | 75.000 | 10.000 | 15.000 | 14 | 13.2 | $1.7 \times 10^4$ | 6.9 |
| 29* | 85.000 | 15.000 | 0 | 38 | 5.3 | $7.0 \times 10^3$ | 10.7 |
| 30* | 84.995 | 15.000 | 0.005 | 23 | 8.6 | $8.0 \times 10^3$ | 8.7 |
| 31* | 84.800 | 15.000 | 0.200 | 17 | 11.8 | $9.0 \times 10^3$ | 9.7 |
| 32* | 84.000 | 15.000 | 1.000 | 19 | 9.8 | $1.0 \times 10^4$ | 9.9 |
| 33* | 75.000 | 15.000 | 10.000 | 24 | 8.7 | $8.0 \times 10^3$ | 15.8 |
| 34* | 70.000 | 15.000 | 15.000 | 39 | 4.2 | $4.0 \times 10^3$ | 18.1 |

Herein, evaluation of characteristics of the elements as baristor can be made by α and C in a voltage-current characteristic equation:

$$I=(V/C)^\alpha$$

(wherein I is current, V is voltage, C is a constant proper to the baristor and α is a non-linearity exponent). Since accurate measurement of C is difficult, in the present invention, characteristic assesment as baristor is made by the value of baristor voltage for unit thickness when 1 mA of baristor current is flowed (hereinafter is called as $V_1mA$/mm.) and by a value of $$\alpha=1/\log (V_{10mA}/V_{1mA})$$

(wherein $V_{10mA}$ is a baristor voltage when a baristor current of 10 mA is flowed and $V_1mA$ is a baristor voltage when baristor current of 1 mA is flowed).

And characteristic assessment as the capacitors are made by a dielectric constant and dielectric loss tan δ at a measurement frequency of 1 KHz. The above-mentioned data are those for firing temperature and time in the reducing atmosphere was 1400° C. and 2 hours, respectively and firing temperature and time in air was 1200° C. and 3 hours, respectively.

EXAMPLE 2

$SrTiO_3$, $Dy_2O_4$ and $ZrO_2$ are in a composition ratio shown in the below-mentioned TABLE 2, and mixing, forming and firings are carried in a similar operation as the above-mentioned EXAMPLE 1, and measurements are made in the similar conditions and results are shown in TABLE 2.

TABLE 2

| Sample No. | Composition ratio (mol %) | | | Characteristics | | | |
|---|---|---|---|---|---|---|---|
| | $SrTiO_3$ | $Dy_2O_3$ | $ZrO_2$ | $V_1mA$ (V/mm) | $\alpha$ | $\epsilon$ | tan $\delta$ (%) |
| 1* | 99.995 | 0 | 0.005 | 101 | 1.0 | $4.0 \times 10^3$ | 9.2 |
| 2* | 99.800 | 0 | 0.200 | 127 | 1.9 | $4.0 \times 10^3$ | 4.4 |
| 3* | 99.000 | 0 | 1.000 | 171 | 2.3 | $7.0 \times 10^3$ | 1.3 |
| 4* | 90.000 | 0 | 10.000 | 196 | 2.8 | $8.0 \times 10^3$ | 4.5 |
| 5* | 99.995 | 0.005 | 0 | 39 | 3.2 | $6.0 \times 10^3$ | 9.6 |
| 6 | 99.990 | 0.005 | 0.005 | 64 | 6.7 | $1.1 \times 10^4$ | 5.4 |
| 7 | 99.795 | 0.005 | 0.200 | 71 | 10.3 | $1.7 \times 10^4$ | 2.9 |
| 8 | 98.995 | 0.005 | 1.000 | 78 | 19.8 | $2.2 \times 10^4$ | 2.4 |
| 9 | 89.995 | 0.005 | 10.000 | 86 | 21.0 | $2.7 \times 10^4$ | 2.6 |
| 10* | 84.995 | 0.005 | 15.000 | 95 | 17.8 | $2.7 \times 10^4$ | 7.4 |
| 11* | 99.800 | 0.200 | 0 | 16 | 5.1 | $8.0 \times 10^3$ | 6.1 |
| 12 | 99.795 | 0.200 | 0.005 | 56 | 14.2 | $1.9 \times 10^4$ | 3.2 |
| 13 | 99.600 | 0.200 | 0.200 | 51 | 19.9 | $3.1 \times 10^4$ | 2.8 |
| 14 | 98.800 | 0.200 | 1.000 | 49 | 22.0 | $3.5 \times 10^4$ | 2.3 |
| 15 | 89.800 | 0.200 | 10.000 | 58 | 20.7 | $3.8 \times 10^4$ | 2.9 |
| 16* | 84.800 | 0.200 | 15.000 | 81 | 19.7 | $3.2 \times 10^4$ | 9.2 |
| 17* | 99.000 | 1.000 | 0 | 13 | 6.0 | $9.0 \times 10^3$ | 8.0 |
| 18 | 98.995 | 1.000 | 0.005 | 59 | 12.4 | $2.0 \times 10^4$ | 3.7 |
| 19 | 98.800 | 1.000 | 0.200 | 65 | 19.9 | $3.1 \times 10^4$ | 3.1 |
| 20 | 98.000 | 1.000 | 1.000 | 77 | 20.9 | $3.8 \times 10^4$ | 3.2 |
| 21 | 89.000 | 1.000 | 10.000 | 83 | 22.0 | $4.4 \times 10^4$ | 3.9 |
| 22* | 84.000 | 1.000 | 15.000 | 107 | 14.6 | $4.3 \times 10^4$ | 9.8 |
| 23* | 90.000 | 10.000 | 0 | 21 | 6.4 | $5.0 \times 10^3$ | 9.4 |
| 24 | 89.800 | 10.000 | 0.005 | 90 | 16.9 | $1.8 \times 10^4$ | 4.0 |
| 25 | 89.800 | 10.000 | 0.200 | 95 | 19.4 | $2.6 \times 10^4$ | 3.3 |
| 26 | 89.000 | 10.000 | 1.000 | 98 | 21.9 | $3.1 \times 10^4$ | 3.0 |
| 27 | 80.000 | 10.000 | 10.000 | 140 | 23.3 | $2.9 \times 10^4$ | 4.7 |
| 28* | 75.000 | 10.000 | 15.000 | 171 | 21.0 | $2.7 \times 10^4$ | 6.9 |
| 29* | 85.000 | 15.000 | 0 | 38 | 5.3 | $7.0 \times 10^3$ | 10.7 |
| 30* | 84.995 | 15.000 | 0.005 | 92 | 9.4 | $8.0 \times 10^3$ | 8.0 |
| 31* | 84.800 | 15.000 | 0.200 | 96 | 11.2 | $1.0 \times 10^4$ | 8.0 |
| 32* | 84.000 | 15.000 | 1.000 | 117 | 10.8 | $1.1 \times 10^4$ | 9.7 |
| 33* | 75.000 | 15.000 | 10.000 | 169 | 9.5 | $7.0 \times 10^3$ | 12.4 |
| 34* | 70.000 | 15.000 | 15.000 | 192 | 9.0 | $4.0 \times 10^3$ | 23.3 |

*Comparison sample

EXAMPLE 3

$SrTiO_3$, $Dy_2O_3$ and NiO are in a composition ratio shown in the below-mentioned TABLE 3, and mixing, forming and firings are carried in a similar operation as the above-mentioned EXAMPLE 1, and measurements are made in the similar conditions and results are shown in TABLE 3.

TABLE 3

| Sample No. | Composition ratio (mol %) | | | Characteristics | | | |
|---|---|---|---|---|---|---|---|
| | $SrTiO_3$ | $Dy_2O_3$ | NiO | $V_1mA$ (V/mm) | $\alpha$ | $\epsilon$ | tan $\delta$ (%) |
| 1* | 99.995 | 0 | 0.005 | 98 | 1.0 | $4.0 \times 10^3$ | 40.4 |
| 2* | 99.800 | 0 | 0.200 | 90 | 1.8 | $4.0 \times 10^3$ | 33.9 |
| 3* | 99.000 | 0 | 1.000 | 87 | 2.1 | $5.0 \times 10^3$ | 30.0 |
| 4* | 90.000 | 0 | 10.000 | 62 | 2.9 | $9.0 \times 10^3$ | 26.0 |
| 5* | 99.995 | 0.005 | 0 | 39 | 3.2 | $6.0 \times 10^3$ | 9.6 |
| 6 | 99.990 | 0.005 | 0.005 | 78 | 6.1 | $1.0 \times 10^4$ | 6.4 |
| 7 | 99.795 | 0.005 | 0.200 | 60 | 9.4 | $1.6 \times 10^4$ | 3.2 |
| 8 | 98.995 | 0.005 | 1.000 | 44 | 16.8 | $1.9 \times 10^4$ | 2.6 |
| 9 | 89.995 | 0.005 | 10.000 | 29 | 18.3 | $2.2 \times 10^4$ | 3.9 |
| 10* | 84.995 | 0.005 | 15.000 | 25 | 10.7 | $2.6 \times 10^4$ | 8.0 |
| 11* | 99.800 | 0.200 | 0 | 16 | 5.1 | $8.0 \times 10^3$ | 6.1 |
| 12 | 99.795 | 0.200 | 0.005 | 63 | 14.7 | $2.1 \times 10^4$ | 3.8 |
| 13 | 99.660 | 0.200 | 0.200 | 50 | 17.1 | $2.9 \times 10^4$ | 2.8 |
| 14 | 98.880 | 0.200 | 1.000 | 36 | 20.3 | $3.2 \times 10^4$ | 2.6 |
| 15 | 89.880 | 0.200 | 10.000 | 26 | 19.4 | $3.5 \times 10^4$ | 3.4 |
| 16* | 84.800 | 0.200 | 15.000 | 23 | 18.1 | $3.8 \times 10^4$ | 8.8 |
| 17* | 99.000 | 1.000 | 0 | 13 | 6.0 | $9.0 \times 10^3$ | 8.0 |
| 18 | 98.995 | 1.000 | 0.005 | 51 | 14.0 | $2.5 \times 10^4$ | 3.0 |
| 19 | 98.800 | 1.000 | 0.200 | 32 | 19.1 | $3.2 \times 10^4$ | 2.7 |
| 20 | 98.000 | 1.000 | 1.000 | 21 | 22.7 | $3.7 \times 10^4$ | 2.4 |
| 21 | 89.000 | 1.000 | 10.000 | 17 | 23.6 | $38 \times 10^4$ | 2.8 |
| 22* | 84.000 | 1.000 | 15.000 | 16 | 23.2 | $4.4 \times 10^4$ | 10.1 |
| 23* | 90.000 | 10.000 | 0 | 21 | 6.4 | $5.0 \times 10^3$ | 9.4 |
| 24 | 89.995 | 10.000 | 0.005 | 44 | 15.4 | $1.8 \times 10^4$ | 3.1 |
| 25 | 89.800 | 10.000 | 0.200 | 31 | 20.9 | $2.2 \times 10^4$ | 2.4 |
| 26 | 89.000 | 10.000 | 1.000 | 19 | 22.0 | $2.4 \times 10^4$ | 3.0 |
| 27 | 80.000 | 10.000 | 10.000 | 12 | 13.9 | $1.9 \times 10^4$ | 4.6 |
| 28* | 75.000 | 10.000 | 15.000 | 14 | 9.8 | $1.5 \times 10^4$ | 6.3 |
| 29* | 85.000 | 15.000 | 0 | 38 | 5.3 | $7.0 \times 10^3$ | 10.7 |
| 30* | 84.995 | 15.000 | 0.005 | 22 | 9.9 | $7.0 \times 10^3$ | 8.1 |
| 31* | 84.800 | 15.000 | 0.200 | 17 | 12.3 | $9.0 \times 10^3$ | 7.9 |
| 32* | 84.000 | 15.000 | 1.000 | 14 | 9.9 | $8.0 \times 10^3$ | 9.2 |
| 33* | 75.000 | 15.000 | 10.000 | 19 | 8.7 | $7.0 \times 10^3$ | 9.8 |

TABLE 3-continued

| Sample | Composition ratio (mol %) | | | Characteristics | | | |
|---|---|---|---|---|---|---|---|
| No. | SrTiO$_3$ | Dy$_2$O$_3$ | NiO | V$_1$mA (V/mm) | $\alpha$ | $\epsilon$ | tan $\delta$ (%) |
| 34* | 70.000 | 15.000 | 15.000 | 35 | 6.3 | 5.0 × 10$^3$ | 22.1 |

*Comparison sample

EXAMPLE 4

SrTiO$_3$, Dy$_2$O$_3$ and SiO$_2$ are in a composition ratio shown in the below-mentioned TABLE 4, and mixing, forming and firings are carried in a similar operation as the above-mentioned EXAMPLE 1, and measurements are made in the similar conditions and results are shown in TABLE 4.

TABLE 4

| Sample | Composition ratio (mol %) | | | Characteristics | | | |
|---|---|---|---|---|---|---|---|
| No. | SrTiO$_3$ | Dy$_2$O$_3$ | SiO$_2$ | V$_1$mA (V/mm) | $\alpha$ | $\epsilon$ | tan $\delta$ (%) |
| 1* | 99.995 | 0 | 0.005 | 90 | 1.0 | 3.0 × 10$^3$ | 35.0 |
| 2* | 99.800 | 0 | 0.200 | 106 | 1.5 | 2.0 × 10$^3$ | 38.1 |
| 3* | 99.000 | 0 | 1.000 | 114 | 2.6 | 3.0 × 10$^3$ | 41.4 |
| 4* | 90.000 | 0 | 10.000 | 198 | 2.7 | 4.0 × 10$^3$ | 59.3 |
| 5* | 99.995 | 0.005 | 0 | 39 | 3.2 | 6.0 × 10$^3$ | 9.6 |
| 6 | 99.990 | 0.005 | 0.005 | 40 | 8.1 | 1.3 × 10$^4$ | 4.2 |
| 7 | 99.795 | 0.005 | 0.200 | 37 | 10.2 | 1.7 × 10$^4$ | 3.8 |
| 8 | 98.995 | 0.005 | 1.000 | 35 | 12.5 | 1.5 × 10$^4$ | 2.9 |
| 9 | 89.995 | 0.005 | 10.000 | 43 | 14.9 | 1.4 × 10$^4$ | 3.0 |
| 10* | 84.995 | 0.005 | 15.000 | 60 | 15.2 | 9.0 × 10$^3$ | 8.1 |
| 11* | 99.800 | 0.200 | 0 | 16 | 5.1 | 8.0 × 10$^3$ | 6.1 |
| 12 | 99.795 | 0.200 | 0.005 | 17 | 10.5 | 1.6 × 10$^4$ | 3.9 |
| 13 | 99.600 | 0.200 | 0.200 | 15 | 14.2 | 3.0 × 10$^4$ | 3.0 |
| 14 | 98.800 | 0.200 | 1.000 | 24 | 18.7 | 4.5 × 10$^4$ | 2.9 |
| 15 | 89.800 | 0.200 | 10.000 | 30 | 19.2 | 4.4 × 10$^4$ | 3.3 |
| 16* | 84.800 | 0.200 | 15.000 | 58 | 16.2 | 2.5 × 10$^4$ | 7.9 |
| 17* | 99.000 | 1.000 | 0 | 13 | 6.0 | 9.0 × 10$^3$ | 8.0 |
| 18 | 98.995 | 1.000 | 0.005 | 15 | 10.0 | 1.8 × 10$^4$ | 3.1 |
| 19 | 98.800 | 1.000 | 0.200 | 25 | 12.6 | 3.0 × 10$^4$ | 3.3 |
| 20 | 98.000 | 1.000 | 1.000 | 34 | 15.7 | 2.3 × 10$^4$ | 3.7 |
| 21 | 89.000 | 1.000 | 10.000 | 55 | 16.4 | 1.9 × 10$^4$ | 4.8 |
| 22* | 84.000 | 1.000 | 15.000 | 90 | 14.4 | 1.0 × 10$^4$ | 7.5 |
| 23* | 90.000 | 10.000 | 0 | 64 | 6.4 | 5.0 × 10$^3$ | 9.4 |
| 24 | 89.995 | 10.000 | 0.005 | 109 | 10.9 | 1.2 × 10$^4$ | 2.6 |
| 25 | 89.800 | 10.000 | 0.200 | 156 | 15.6 | 1.9 × 10$^4$ | 2.9 |
| 26 | 89.000 | 10.000 | 1.000 | 162 | 16.2 | 1.4 × 10$^4$ | 3.1 |
| 27 | 80.000 | 10.000 | 10.000 | 178 | 17.8 | 1.3 × 10$^4$ | 3.5 |
| 28* | 75.000 | 10.000 | 15.000 | 190 | 19.0 | 9.0 × 10$^3$ | 6.5 |
| 29* | 85.000 | 15.000 | 0 | 53 | 5.3 | 7.0 × 10$^3$ | 10.7 |
| 30* | 84.995 | 15.000 | 0.005 | 75 | 7.5 | 1.7 × 10$^4$ | 9.8 |
| 31* | 84.800 | 15.000 | 0.200 | 76 | 7.6 | 1.5 × 10$^4$ | 10.2 |
| 32* | 84.000 | 15.000 | 1.000 | 81 | 8.1 | 1.1 × 10$^4$ | 18.4 |
| 33* | 75.000 | 15.000 | 10.000 | 93 | 9.3 | 7.0 × 10$^3$ | 24.4 |
| 34* | 70.000 | 15.000 | 15.000 | 65 | 6.5 | 4.0 × 10$^3$ | 29.3 |

*Comparison sample

As shown by EXAMPLEs 1 through 4, Dy$_2$O$_3$ with its added value in a range of 0.005–10.000 mol %, contributes to reduce specific resistance of the reduced fired body, and by re-firing in air it shows baristor characteristics.

This is because that granules and grain boundaries of fied body obtained by the reduced firing is of low resistances, and by re-firing in the air only crystal boundaries become to high resistance thereby forming electric barriers.

However, when only Dy$_2$O$_3$ is added, the electric barrier formed at the grain boundaries are small, and the baristor characteristics are relatively small.

Accordingly, by adding additives such as BaO, ZrO$_2$, NiO, SiO$_2$, Gd$_2$O$_3$, the additive is segregated at the grain boundaries during the reduced firing, and by re-firing in the air such additive forms large electric barrier at the grain boundary, thereby making the baristor characteristics large.

And, by making the crystal grain boundary only in high resistance, capacitance characteristics is presented between crystal granule—crystal grain boundaries—crystal granules.

Accordingly, by adding Dy$_2$O$_3$ and additive such as BaO, CeO$_2$, La$_2$O$_3$, Y$_2$O$_3$, ZrO$_2$, NiO, Ga$_2$O$_3$, SiO$_2$, to SrTiO$_3$, it is possible to provide characteristics combining the baristor characteristics and the capacitance characteristics.

The case such effect is presented is within a range that Py$_2$O$_3$ is 0.005–10.000 mol %, BaO, ZrO$_2$, NiO, SiO$_2$ or is 0.005–10.000 mol %.

Though in the above-mentioned EXAMPLEs 1–9, the elucidation was made for the cases where an additive was added in a single one, it was confirmed that when in place of the above-mentioned, an oxide of Ca, Cd, In, Cs, Sn, W, Fe, Pt, Tl, Be, Li, Lu, Th, Ir, Os, Hf, Ru as single one in a range of the above-mentioned predetermined amount was added, the similar effect was obtained.

Besides, it was confirmed that the same effect was obtained even when two kinds or more of oxides of these Ca, Cd, In, Ba, Pb, Cs, Zr, Sn, W, Ni, Fe, Pt, Tl, Si, Be, Li, Ir, Os, Hf and Ru were used in a manner that total added amount is within the above-mentioned range.

EXAMPLE 5

After measuring SrTiO$_3$, extremely small amount of Nb$_2$O$_5$ which was existing from the initial stage of material (Nb$_2$O$_5$ content in the material used in the present example was 0.050 mol %), Dy$_2$O$_3$ as oxide of metal for acceleration of semiconductorization and CaO as element to improve non-linearity to become composition ratios shown in the below-mentioned TABLE 10, they were mixed and ground and dried, and thereafter calcinated at 1000° C. for 4 hours. Thereafter, it was ground in wet method by ball mill or the like for 4 hours, and dried, and subsequently, after granulating adding 8 wt % of an organic binder (for instance, polyvinylalcohol), press-formed into a shape of disc of 8.0$\phi$ (mm)×1.0 t (mm) with forming pressure of about 1.0 t/cm$^2$. The formed body was fired for 4 hours in a reducing atmosphere (for instance, N$_2$:H$_2$=1:1, flow rate is 1.0 l/min) and at 1350° C. Specific resistance of the fired body thus obtained was averagely 0.3 Ω.cm, and average granule size was 30 μm.

Figure 3:
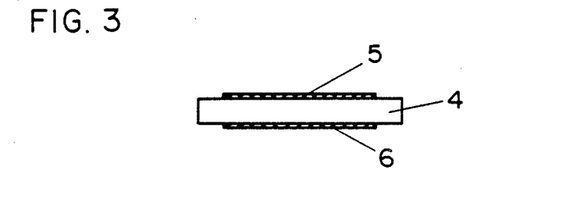
FIG. 3 is a sectional view of an element using voltage dependent non-linear resistance ceramic composition in accordance with the present invention.

Nextly, the above-mentioned fired body was baked in the air for 2 hours at 1300° C. to obtain a sintered body 4 of FIG. 3. And both faces of the above-mentioned sintered body 4 are ground by using an abrasive such as SiC or the like, and electrodes 5, 6 are formed by using conductive metal such as Ag on the ground faces. Sizes of the electrodes 5, 6 are circle of 5.0$\phi$ (mm).

Characteristics of the devices thus obtained are shown in TABLE 5.

TABLE 5

| Sample No. | Composition ratio (mol %) | | | | Characteristics | | | |
|---|---|---|---|---|---|---|---|---|
| | SrTiO$_3$ | Nb$_2$O$_5$ | Dy$_2$O$_3$ | CaO | V$_1$mA/mm (V) | α | ε | tan δ (%) |
| 1* | 99.945 | 0.050 | 0 | 0.005 | 100 | 1.0 | 4.0 × 10$^3$ | 41.6 |
| 2* | 99.750 | 0.050 | 0 | 0.200 | 88 | 1.2 | 4.0 × 10$^3$ | 33.7 |
| 3* | 98.950 | 0.050 | 0 | 1.000 | 84 | 1.4 | 5.0 × 10$^3$ | 31.9 |
| 4* | 89.950 | 0.050 | 0 | 10.000 | 75 | 1.7 | 9.0 × 10$^3$ | 27.4 |
| 5* | 99.945 | 0.050 | 0.005 | 0 | 41 | 3.2 | 6.0 × 10$^3$ | 9.8 |
| 6 | 99.940 | 0.050 | 0.005 | 0.005 | 70 | 6.4 | 1.0 × 10$^4$ | 5.3 |
| 7 | 99.745 | 0.050 | 0.005 | 0.200 | 61 | 9.0 | 1.8 × 10$^4$ | 3.3 |
| 8 | 98.945 | 0.050 | 0.005 | 1.000 | 48 | 11.7 | 2.1 × 10$^4$ | 2.7 |
| 9 | 89.945 | 0.050 | 0.005 | 10.000 | 43 | 12.0 | 2.3 × 10$^4$ | 3.9 |
| 10* | 84.945 | 0.050 | 0.005 | 15.000 | 40 | 11.5 | 2.5 × 10$^4$ | 8.4 |
| 11* | 99.750 | 0.050 | 0.200 | 0 | 36 | 5.1 | 7.0 × 10$^3$ | 6.7 |
| 12 | 99.745 | 0.050 | 0.200 | 0.005 | 68 | 7.7 | 1.1 × 10$^4$ | 2.4 |
| 13 | 99.550 | 0.050 | 0.200 | 0.200 | 65 | 10.2 | 1.7 × 10$^4$ | 2.3 |
| 14 | 98.750 | 0.050 | 0.200 | 1.000 | 61 | 11.3 | 2.4 × 10$^4$ | 2.5 |
| 15 | 89.750 | 0.050 | 0.200 | 10.000 | 61 | 12.4 | 2.9 × 10$^4$ | 2.6 |
| 16* | 84.750 | 0.050 | 0.200 | 15.000 | 60 | 11.5 | 2.6 × 10$^4$ | 8.7 |
| 17* | 98.950 | 0.050 | 1.000 | 0 | 33 | 6.0 | 8.0 × 10$^3$ | 8.0 |
| 18 | 98.945 | 0.050 | 1.000 | 0.005 | 65 | 8.2 | 1.0 × 10$^4$ | 2.8 |
| 19 | 98.750 | 0.050 | 1.000 | 0.200 | 57 | 10.8 | 1.6 × 10$^4$ | 2.4 |
| 20 | 97.950 | 0.050 | 1.000 | 1.000 | 49 | 11.2 | 2.1 × 10$^4$ | 2.6 |
| 21 | 88.950 | 0.050 | 1.000 | 10.000 | 45 | 12.1 | 2.8 × 10$^4$ | 3.3 |
| 22* | 83.950 | 0.050 | 1.000 | 15.000 | 54 | 11.6 | 2.4 × 10$^4$ | 10.4 |
| 23* | 89.950 | 0.050 | 10.000 | 0 | 42 | 6.4 | 5.0 × 10$^3$ | 9.4 |
| 24 | 89.945 | 0.050 | 10.000 | 0.005 | 64 | 8.5 | 1.0 × 10$^4$ | 3.0 |
| 25 | 89.750 | 0.050 | 10.000 | 0.200 | 59 | 9.9 | 1.7 × 10$^4$ | 2.4 |
| 26 | 88.950 | 0.050 | 10.000 | 1.000 | 48 | 11.0 | 2.0 × 10$^4$ | 2.7 |
| 27 | 79.950 | 0.050 | 10.000 | 10.000 | 60 | 12.4 | 2.9 × 10$^4$ | 3.9 |
| 28* | 74.950 | 0.050 | 10.000 | 15.000 | 64 | 10.2 | 2.7 × 10$^4$ | 10.7 |
| 29* | 84.950 | 0.050 | 15.000 | 0 | 85 | 5.0 | 7.0 × 10$^3$ | 10.5 |
| 30* | 84.945 | 0.050 | 15.000 | 0.005 | 83 | 8.6 | 8.0 × 10$^3$ | 8.2 |
| 31* | 83.750 | 0.050 | 15.000 | 0.200 | 77 | 10.8 | 9.0 × 10$^3$ | 9.9 |
| 32* | 83.950 | 0.050 | 15.000 | 1.000 | 79 | 9.8 | 9.0 × 10$^3$ | 10.3 |
| 33* | 74.950 | 0.050 | 15.000 | 10.000 | 94 | 8.1 | 8.0 × 10$^3$ | 15.9 |
| 34* | 69.950 | 0.050 | 15.000 | 15.000 | 128 | 5.4 | 5.0 × 10$^3$ | 19.1 |

*Comparison sample

EXAMPLE 6

SrTiO$_3$, very small amount of Nb$_2$O$_5$ which was existing from initial stage of material (contents of Nb$_2$O$_5$ of the material used in the present example was 0.050 mol %), Dy$_2$O$_3$ as oxide of metal for accelerating semicondoctorization and ZrO$_2$ as an element to improve non-linearity are formed, reduced and fired, and oxidated in the similar operation as that of the above-mentioned EXAMPLE 5. Results obtained by measuring in the similar condition as that of the above-mentioned of the characteristics of devices thus obtained were shown in TABLE 6.

TABLE 6

| Sample No. | Composition ratio (mol %) | | | | Characteristics | | | |
|---|---|---|---|---|---|---|---|---|
| | SrTiO$_3$ | Nb$_2$O$_5$ | Dy$_2$O$_3$ | ZrO$_2$ | V$_1$mA/mm (V) | α | ε | tan δ (%) |
| 1* | 99.945 | 0.050 | 0 | 0.005 | 103 | 1.0 | 4.0 × 10$^3$ | 39.2 |
| 2* | 99.750 | 0.050 | 0 | 0.200 | 129 | 1.3 | 4.0 × 10$^3$ | 34.4 |
| 3* | 98.950 | 0.050 | 0 | 1.000 | 173 | 1.9 | 7.0 × 10$^3$ | 31.5 |
| 4* | 89.950 | 0.050 | 0 | 10.000 | 198 | 2.0 | 8.0 × 10$^3$ | 24.7 |
| 5* | 99.945 | 0.050 | 0.005 | 0 | 41 | 3.2 | 6.0 × 10$^3$ | 9.8 |
| 6 | 99.940 | 0.050 | 0.005 | 0.005 | 66 | 6.7 | 9.0 × 10$^3$ | 5.4 |
| 7 | 99.745 | 0.050 | 0.005 | 0.200 | 73 | 9.3 | 1.1 × 10$^4$ | 2.9 |
| 8 | 98.945 | 0.050 | 0.005 | 1.000 | 80 | 10.3 | 1.5 × 10$^4$ | 2.7 |
| 9 | 89.945 | 0.050 | 0.005 | 10.000 | 88 | 11.0 | 1.7 × 10$^4$ | 2.8 |
| 10* | 84.945 | 0.050 | 0.005 | 15.000 | 97 | 11.4 | 1.8 × 10$^4$ | 7.4 |

TABLE 6-continued

| Sample No. | Composition ratio (mol %) | | | | Characteristics | | | |
|---|---|---|---|---|---|---|---|---|
| | $SrTiO_3$ | $Nb_2O_5$ | $Dy_2O_3$ | $ZrO_2$ | $V_{1mA}/mm$ (V) | $\alpha$ | $\epsilon$ | tan $\delta$ (%) |
| 11* | 99.750 | 0.050 | 0.200 | 0 | 36 | 5.1 | $7.0 \times 10^3$ | 6.7 |
| 12 | 99.745 | 0.050 | 0.200 | 0.005 | 76 | 8.2 | $1.3 \times 10^4$ | 3.2 |
| 13 | 99.550 | 0.050 | 0.200 | 0.200 | 71 | 9.9 | $1.7 \times 10^4$ | 2.8 |
| 14 | 98.750 | 0.050 | 0.200 | 1.000 | 69 | 10.0 | $1.9 \times 10^4$ | 2.5 |
| 15 | 89.750 | 0.050 | 0.200 | 10.000 | 78 | 10.7 | $2.5 \times 10^4$ | 2.9 |
| 16* | 84.750 | 0.050 | 0.200 | 15.000 | 101 | 11.2 | $2.1 \times 10^4$ | 9.2 |
| 17* | 98.950 | 0.050 | 1.000 | 0 | 33 | 6.0 | $8.0 \times 10^3$ | 8.0 |
| 18 | 98.945 | 0.050 | 1.000 | 0.005 | 79 | 9.9 | $1.5 \times 10^4$ | 2.7 |
| 19 | 98.750 | 0.050 | 1.000 | 0.200 | 85 | 10.4 | $1.9 \times 10^4$ | 2.5 |
| 20 | 97.950 | 0.050 | 1.000 | 1.000 | 97 | 11.0 | $2.1 \times 10^4$ | 2.4 |
| 21 | 88.950 | 0.050 | 1.000 | 10.000 | 103 | 12.0 | $2.8 \times 10^4$ | 3.0 |
| 22* | 83.950 | 0.050 | 1.000 | 15.000 | 127 | 11.6 | $2.3 \times 10^4$ | 10.0 |
| 23* | 89.950 | 0.050 | 10.000 | 0 | 42 | 6.4 | $5.0 \times 10^3$ | 9.4 |
| 24 | 89.945 | 0.050 | 10.000 | 0.005 | 110 | 10.4 | $1.8 \times 10^4$ | 3.2 |
| 25 | 89.750 | 0.050 | 10.000 | 0.200 | 115 | 10.9 | $2.0 \times 10^4$ | 2.8 |
| 26 | 88.950 | 0.050 | 10.000 | 1.000 | 119 | 11.8 | $2.1 \times 10^4$ | 3.5 |
| 27 | 79.950 | 0.050 | 10.000 | 10.000 | 160 | 12.3 | $2.6 \times 10^4$ | 4.7 |
| 28* | 74.950 | 0.050 | 10.000 | 15.000 | 191 | 11.0 | $2.0 \times 10^4$ | 11.9 |
| 29* | 84.950 | 0.050 | 15.000 | 0 | 85 | 5.0 | $7.0 \times 10^3$ | 10.5 |
| 30* | 84.945 | 0.050 | 15.000 | 0.005 | 112 | 9.4 | $7.0 \times 10^3$ | 8.0 |
| 31* | 84.750 | 0.050 | 15.000 | 0.200 | 116 | 10.2 | $8.0 \times 10^3$ | 9.2 |
| 32* | 83.950 | 0.050 | 15.000 | 1.000 | 137 | 10.3 | $9.0 \times 10^3$ | 9.7 |
| 33* | 74.950 | 0.050 | 15.000 | 10.000 | 189 | 9.0 | $7.0 \times 10^3$ | 12.6 |
| 34* | 69.950 | 0.050 | 15.000 | 15.000 | 212 | 8.7 | $4.0 \times 10^3$ | 23.4 |

*Comparison sample

EXAMPLE 7

$SrTiO_3$, very small amount of $Nb_2O_5$ which was existing from initial stage of material (contents of $Nb_2O_5$ of the material used in the present example was 0.050 mol %), $Dy_2O_3$ as oxide of metal for accelerating semiconductorization and NiO as an element to improve non-linearity are formed, reduced and fired, and oxidated in the similar operation as that of the above-mentioned EXAMPLE 5. Results obtained by measuring in the similar condition as that of the above-mentioned of the characteristics of devices thus obtained were shown in TABLE 7.

TABLE 7

| Sample No. | Composition ratio (mol %) | | | | Characteristics | | | |
|---|---|---|---|---|---|---|---|---|
| | $SrTiO_3$ | $Nb_2O_5$ | $Dy_2O_3$ | NiO | $V_{1mA}/mm$ (V) | $\alpha$ | $\epsilon$ | tan $\delta$ (%) |
| 1* | 99.945 | 0.050 | 0 | 0.005 | 100 | 1.0 | $4.0 \times 10^3$ | 40.4 |
| 2* | 99.750 | 0.050 | 0 | 0.200 | 92 | 1.2 | $4.0 \times 10^3$ | 35.9 |
| 3* | 98.950 | 0.050 | 0 | 1.000 | 89 | 1.3 | $5.0 \times 10^3$ | 30.2 |
| 4* | 89.950 | 0.050 | 0 | 10.000 | 64 | 1.7 | $7.0 \times 10^3$ | 26.0 |
| 5* | 99.945 | 0.050 | 0.005 | 0 | 41 | 3.2 | $6.0 \times 10^3$ | 9.8 |
| 6 | 99.940 | 0.050 | 0.005 | 0.005 | 80 | 6.1 | $9.0 \times 10^3$ | 6.4 |
| 7 | 99.745 | 0.050 | 0.005 | 0.200 | 62 | 9.4 | $1.0 \times 10^4$ | 3.5 |
| 8 | 98.945 | 0.050 | 0.005 | 1.000 | 46 | 10.2 | $1.4 \times 10^4$ | 2.9 |
| 9 | 89.945 | 0.050 | 0.005 | 10.000 | 31 | 10.3 | $1.6 \times 10^4$ | 3.8 |
| 10* | 84.945 | 0.050 | 0.005 | 15.000 | 35 | 10.7 | $1.9 \times 10^4$ | 8.0 |
| 11* | 99.750 | 0.050 | 0.200 | 0 | 36 | 5.1 | $7.0 \times 10^3$ | 6.7 |
| 12 | 99.745 | 0.050 | 0.200 | 0.005 | 85 | 7.4 | $1.1 \times 10^4$ | 5.4 |
| 13 | 99.550 | 0.050 | 0.200 | 0.200 | 70 | 10.1 | $1.7 \times 10^4$ | 3.8 |
| 14 | 98.750 | 0.050 | 0.200 | 1.000 | 56 | 10.3 | $1.9 \times 10^4$ | 2.6 |
| 15 | 89.750 | 0.050 | 0.200 | 10.000 | 49 | 11.4 | $2.0 \times 10^4$ | 2.7 |
| 16* | 84.750 | 0.050 | 0.200 | 15.000 | 43 | 11.1 | $2.5 \times 10^4$ | 8.8 |
| 17* | 98.950 | 0.050 | 1.000 | 0 | 33 | 6.0 | $8.0 \times 10^3$ | 8.0 |
| 18 | 98.945 | 0.050 | 1.000 | 0.005 | 71 | 9.1 | $1.9 \times 10^4$ | 5.1 |
| 19 | 98.750 | 0.050 | 1.000 | 0.200 | 62 | 10.7 | $2.0 \times 10^4$ | 3.0 |
| 20 | 97.950 | 0.050 | 1.000 | 1.000 | 51 | 11.1 | $2.5 \times 10^4$ | 2.6 |
| 21 | 88.950 | 0.050 | 1.000 | 10.000 | 47 | 12.2 | $2.7 \times 10^4$ | 2.8 |
| 22* | 83.950 | 0.050 | 1.000 | 15.000 | 46 | 12.6 | $2.7 \times 10^4$ | 10.4 |
| 23* | 89.950 | 0.050 | 10.000 | 0 | 42 | 6.4 | $5.0 \times 10^3$ | 9.4 |
| 24 | 89.945 | 0.050 | 10.000 | 0.005 | 64 | 10.4 | $1.8 \times 10^4$ | 4.8 |
| 25 | 89.750 | 0.050 | 10.000 | 0.200 | 61 | 10.9 | $2.0 \times 10^4$ | 3.0 |
| 26 | 88.950 | 0.050 | 10.000 | 1.000 | 58 | 11.0 | $2.2 \times 10^4$ | 2.9 |
| 27 | 79.950 | 0.050 | 10.000 | 10.000 | 52 | 10.8 | $1.9 \times 10^4$ | 3.6 |
| 28* | 74.950 | 0.050 | 10.000 | 15.000 | 60 | 9.2 | $1.5 \times 10^4$ | 14.1 |
| 29* | 84.950 | 0.050 | 15.000 | 0 | 85 | 5.0 | $7.0 \times 10^3$ | 10.5 |
| 30* | 84.945 | 0.050 | 15.000 | 0.005 | 82 | 9.4 | $7.0 \times 10^3$ | 9.1 |
| 31* | 84.750 | 0.050 | 15.000 | 0.200 | 67 | 10.3 | $8.0 \times 10^3$ | 8.9 |
| 32* | 83.950 | 0.050 | 15.000 | 1.000 | 64 | 9.1 | $9.0 \times 10^3$ | 9.2 |
| 33* | 74.950 | 0.050 | 15.000 | 10.000 | 79 | 8.6 | $7.0 \times 10^3$ | 10.8 |
| 34* | 69.950 | 0.050 | 15.000 | 15.000 | 135 | 6.2 | $7.0 \times 10^3$ | 23.1 |

*Comparison sample

As shown by EXAMPLEs 5 through 7, in a case $Dy_2O_3$ with its added value of 0.005-10.000 mol % and small amount of $Nb_2O_5$ contributes to reduce specific resistance of the reduced fired body, and by re-firing in air it shows baristor characteristics.

Herein, the amount of $Nb_2O_5$ is that of impurity naturally included in starting material $TiO_2$, and is in a range of 0.001-0.200 mol % as a result of analysis.

Though for semiconductorization of $SrTiO_3$, $Dy_2O_3$ is effective, the effect of $Dy_2O_3$ is not damaged even in the case wherein $Nb_2O_5$ is contained at the same time. Accordingly, even when $Dy_2O_3$ and $Nb_2O_5$ are used at the same time as accelerating agent for semiconductorization, it is possible to produce the baristor characteristics.

However, in the case when $Dy_2O_3$ and $Nb_2O_5$ only are added, the electric barrier formed at the grain boundaries is low, and the baristor characteristics are relatively small.

Therefore, when such additive as $CaO$, $ZrO_2$, $NiO$, $Ga_2O_3$, or the like is added, the added substance is segregated at the crystal granule boundaries during the reducing firing, and by re-firing the air these additives contribute to make the crystal grain boundaries in high resistance, and the baristor characteristics become greater.

Besides, since only the crystal grain boundaries only becomes high resistance, capacitance characteristic is presented between crystal grain-crystal grain boundary-crystal grain.

Accordingly, by adding $Dy_2O_3$, $Nb_2O_5$ and $CaO$, $ZrO_2$, $NiO$, to $SrTiO_3$, it is possible to provide characteristics combining the baristor characteristics and the capacitance characteristics. The case such effect is presented is within a range that $Dy_2O_3$ is 0.005-10.000 mol %, $Nb_2O_5$ is 0.001-0.200 mol %, $CaO$, $ZrO_2$, $NiO$, or $Ga_2O_3$ or is 0.005-10.000 mol %.

Though in the above-mentioned EXAMPLEs 5-7, the cases where an additive is added in a single one, it was confirmed that even when in place of the above-mentioned, an oxide of Cd, In, Ba, Cs, Sn, W, Fe, Pt, Tl, Si, Be, Li, Ir, Os, Hf and Ru as single one in a range of the above-mentioned predetermined amount was added, the similar effect was obtained.

Besides, it was confirmed that the same effect was obtained even when two kinds or more of oxides of these Ca, Cd, In, Ba, Cs, Zr, Sn, W, Ni, Fe, Pt, Tl, Be, Li, Ir, Os, Hf and Ru were used in a manner that total added amount is within the above-mentioned range.

Figure 4:
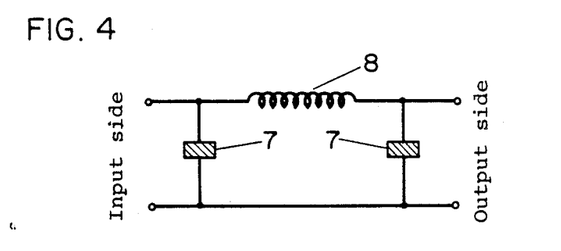
FIG. 4 is a circuit diagram of a noise filter using the voltage dependent non-linear resistance ceramic composition in accordance with the present invention.

By using elements 7 made by providing electrodes by conductive material such as Ag on the sintered body obtained as above and a coil 8, a noise filter shown in FIG. 4 is constituted, and by impressing noise input A shown in FIG. 5 thereon, a noise output B was obtained.

As is obvious from this, the noise is satisfactorily eliminated, and besides, number of components decreases by combination of the element unit and the coil, enabling miniaturization.

EXAMPLE 8

After measuring $SrTiO_3$, $Ta_2O_5$ and $CdO$ to become composition ratios shown in the below-mentioned TABLE 8, they were mixed in wet method in a ball mill or the like for 6 hours, and dried, and thereafter calcinated at 1000°-1250° C. in the air for 1-5 hours. Thereafter, it was ground in wet method by ball mill or the like for 4 hours, and dried, and subsequently, after granulating adding 8 wt % of an organic binder (for instance, polyvinylalcohol), press-formed into a shape of disc of 8.0 (mm)$\phi \times$ 1.0 (mm)t with forming pressure of about 1.0 t/cm$^2$. The formed body was fired for 1-6 hours in a reducing atmosphere (for instance, $N_2:H_2=10:1$) and at 1300°-1450° C. Specific resistance of the fired body thus obtained was averagely 0.1-0.8 $\Omega$.cm, and average granule size was 20-50 $\mu$m. Nextly, the above-mentioned fired body was baked in the air for 0.5-5 hours at 1000°-1300° C. to obtain a sintered body 4 of FIG. 3. And both faces of the above-mentioned sintered body 4 are ground by using an abrasive such as SiC, and electrodes 5, 6 are formed by using conductive metal such as Ag thereon. Sizes of the electrodes 5, 6 are circle of 5.0 (mm)$\phi$.

Characteristics of the devices thus obtained are shown in TABLE 8. With respect to assesment of baristor element thus obtained, they were made in the same condition as EXAMPLE 1.

TABLE 8

| Sample No. | Composition ratio (mol %) | | | Characteristics | | | |
|---|---|---|---|---|---|---|---|
| | $SrTiO_3$ | $Ta_2O_5$ | $CdO$ | $V_{1mA}$ (V/mm) | $\alpha$ | $\epsilon$ | $\tan \delta$ (%) |
| 1* | 99.995 | 0 | 0.005 | 80 | 1.0 | $4.0 \times 10^3$ | 35.2 |
| 2* | 99.800 | 0 | 0.200 | 85 | 1.3 | $4.0 \times 10^3$ | 36.3 |
| 3* | 99.000 | 0 | 1.000 | 101 | 1.6 | $5.0 \times 10^3$ | 43.1 |
| 4* | 90.000 | 0 | 10.000 | 174 | 2.0 | $7.0 \times 10^3$ | 57.6 |
| 5* | 99.995 | 0.005 | 0 | 78 | 3.3 | $5.0 \times 10^3$ | 8.6 |
| 6 | 99.990 | 0.005 | 0.005 | 60 | 8.8 | $7.0 \times 10^3$ | 6.5 |
| 7 | 99.795 | 0.005 | 0.200 | 51 | 9.9 | $1.4 \times 10^4$ | 3.7 |
| 8 | 98.995 | 0.005 | 1.000 | 57 | 11.6 | $1.7 \times 10^4$ | 4.2 |
| 9 | 89.995 | 0.005 | 10.000 | 60 | 13.9 | $1.9 \times 10^4$ | 4.5 |
| 10* | 84.995 | 0.005 | 15.000 | 73 | 12.5 | $1.4 \times 10^4$ | 9.7 |
| 11* | 99.800 | 0.200 | 0 | 72 | 4.3 | $7.0 \times 10^3$ | 5.1 |
| 12 | 99.795 | 0.200 | 0.005 | 53 | 9.5 | $1.2 \times 10^4$ | 2.2 |
| 13 | 99.600 | 0.200 | 0.200 | 39 | 11.3 | $1.9 \times 10^4$ | 2.7 |
| 14 | 98.800 | 0.200 | 1.000 | 43 | 14.3 | $2.0 \times 10^4$ | 3.2 |
| 15 | 89.800 | 0.200 | 10.000 | 54 | 15.1 | $1.8 \times 10^4$ | 4.4 |
| 16* | 84.800 | 0.200 | 15.000 | 75 | 15.0 | $1.2 \times 10^4$ | 9.5 |
| 17* | 99.000 | 1.000 | 0 | 69 | 5.5 | $9.0 \times 10^3$ | 7.0 |
| 18 | 98.995 | 1.000 | 0.005 | 41 | 11.9 | $2.3 \times 10^4$ | 2.6 |
| 19 | 98.800 | 1.000 | 0.200 | 32 | 14.2 | $2.8 \times 10^4$ | 3.8 |
| 20 | 98.000 | 1.000 | 1.000 | 39 | 18.4 | $2.4 \times 10^4$ | 3.7 |
| 21 | 89.000 | 1.000 | 10.000 | 48 | 19.0 | $1.8 \times 10^4$ | 4.4 |
| 22* | 84.000 | 1.000 | 15.000 | 77 | 19.5 | $1.7 \times 10^4$ | 10.8 |
| 23* | 90.000 | 10.000 | 0 | 61 | 6.3 | $9.0 \times 10^3$ | 8.4 |
| 24 | 89.995 | 10.000 | 0.005 | 40 | 13.0 | $1.7 \times 10^4$ | 3.4 |
| 25 | 89.800 | 10.000 | 0.200 | 31 | 14.9 | $2.3 \times 10^4$ | 3.7 |
| 26 | 89.000 | 10.000 | 1.000 | 42 | 16.9 | $1.9 \times 10^4$ | 4.4 |
| 27 | 80.000 | 10.000 | 10.000 | 56 | 18.1 | $1.8 \times 10^4$ | 4.2 |
| 28* | 75.000 | 10.000 | 15.000 | 97 | 17.8 | $1.5 \times 10^4$ | 12.9 |

TABLE 8-continued

| Sample No. | Composition ratio (mol %) | | | Characteristics | | | |
|---|---|---|---|---|---|---|---|
| | $SrTiO_3$ | $Ta_2O_5$ | CdO | $V_1mA$ (V/mm) | $\alpha$ | $\epsilon$ | $\tan \delta$ (%) |
| 29* | 85.000 | 15.000 | 0 | 74 | 6.6 | $7.0 \times 10^3$ | 9.7 |
| 30* | 84.995 | 15.000 | 0.005 | 62 | 12.0 | $1.2 \times 10^4$ | 6.3 |
| 31* | 84.800 | 15.000 | 0.200 | 60 | 13.2 | $1.2 \times 10^4$ | 7.2 |
| 32* | 84.000 | 15.000 | 1.000 | 69 | 15.8 | $9.0 \times 10^3$ | 10.6 |
| 33* | 75.000 | 15.000 | 10.000 | 82 | 13.6 | $6.0 \times 10^3$ | 14.6 |
| 34* | 70.000 | 15.000 | 15.000 | 124 | 8.8 | $4.0 \times 10^3$ | 22.7 |

*Comparison sample

EXAMPLE 9

$SrTiO_3$, $Ta_2O_5$ and BaO are made in composition ratios shown in Table 9, and mixing, forming and firing are made in the similar operations as those of the above-mentioned EXAMPLE 8, and measured results made under the similar condition are shown in Table 9.

EXAMPLE 10

$SrTiO_3$, $Ta_2O_5$ and $La_2O_3$ are made in composition ratios shown in Table 10, and mixing, forming and firing are made in the similar operations as those of the above-mentioned EXAMPLE 8, and measured results made under the similar condition are shown in Table 10.

TABLE 9

| Sample No. | Composition ratio (mol %) | | | Characteristics | | | |
|---|---|---|---|---|---|---|---|
| | $SrTiO_3$ | $Ta_2O_5$ | BaO | $V_1mA$ (V/mm) | $\alpha$ | $\epsilon$ | $\tan \delta$ (%) |
| 1* | 99.995 | 0 | 0.005 | 79 | 1.0 | $4.0 \times 10^3$ | 34.4 |
| 2* | 99.800 | 0 | 0.200 | 83 | 1.5 | $4.0 \times 10^3$ | 35.4 |
| 3* | 99.000 | 0 | 1.000 | 100 | 1.7 | $5.0 \times 10^3$ | 41.5 |
| 4* | 90.000 | 0 | 10.000 | 165 | 2.1 | $7.0 \times 10^3$ | 46.3 |
| 5* | 99.995 | 0.005 | 0 | 78 | 3.3 | $5.0 \times 10^3$ | 8.6 |
| 6 | 99.990 | 0.005 | 0.005 | 60 | 8.6 | $7.0 \times 10^3$ | 6.3 |
| 7 | 99.795 | 0.005 | 0.200 | 49 | 9.7 | $1.5 \times 10^4$ | 3.1 |
| 8 | 98.995 | 0.005 | 1.000 | 55 | 10.6 | $1.7 \times 10^4$ | 3.8 |
| 9 | 89.995 | 0.005 | 10.000 | 58 | 12.9 | $2.0 \times 10^4$ | 4.9 |
| 10* | 84.995 | 0.005 | 15.000 | 72 | 12.5 | $1.4 \times 10^4$ | 9.2 |
| 11* | 99.800 | 0.200 | 0 | 72 | 4.3 | $7.0 \times 10^3$ | 5.1 |
| 12 | 99.795 | 0.200 | 0.005 | 53 | 9.3 | $1.6 \times 10^4$ | 2.7 |
| 13 | 99.600 | 0.200 | 0.200 | 37 | 10.3 | $2.4 \times 10^4$ | 2.5 |
| 14 | 98.800 | 0.200 | 1.000 | 43 | 13.3 | $2.5 \times 10^4$ | 2.0 |
| 15 | 89.800 | 0.200 | 10.000 | 51 | 14.1 | $2.0 \times 10^4$ | 3.2 |
| 16* | 84.800 | 0.200 | 15.000 | 70 | 15.8 | $1.8 \times 10^4$ | 8.7 |
| 17* | 99.000 | 1.000 | 0 | 69 | -5.5 | $9.0 \times 10^3$ | 7.0 |
| 18 | 98.995 | 1.000 | 0.005 | 40 | 11.7 | $2.4 \times 10^4$ | 2.8 |
| 19 | 98.800 | 1.000 | 0.200 | 23 | 13.6 | $2.8 \times 10^4$ | 2.7 |
| 20 | 98.000 | 1.000 | 1.000 | 36 | 16.2 | $2.5 \times 10^4$ | 3.8 |
| 21 | 89.00 | 1.000 | 10.000 | 43 | 18.3 | $2.1 \times 10^4$ | 4.1 |
| 22* | 84.000 | 1.000 | 15.00 | 75 | 18.7 | $1.4 \times 10^4$ | 10.5 |
| 23* | 90.000 | 10.000 | 0 | 61 | 6.3 | $9.0 \times 10^3$ | 8.4 |
| 24 | 89.995 | 10.000 | 0.000 | 39 | 13.5 | $1.8 \times 10^4$ | 3.7 |
| 25 | 89.800 | 10.000 | 0.200 | 21 | 15.2 | $2.3 \times 10^4$ | 3.6 |
| 26 | 89.000 | 10.000 | 1.000 | 33 | 17.3 | $2.0 \times 10^4$ | 3.9 |
| 27 | 80.000 | 10.000 | 10.000 | 45 | 20.0 | $1.8 \times 10^4$ | 7.1 |
| 28* | 75.000 | 15.000 | 15.00 | 79 | 19.5 | $1.7 \times 10^4$ | 11.3 |
| 29* | 85.000 | 0 | 0 | 74 | 6.6 | $7.0 \times 10^3$ | 9.7 |
| 30* | 84.995 | 15.000 | 0.005 | 51 | 12.5 | $1.2 \times 10^4$ | 5.1 |
| 31* | 84.800 | 15.000 | 0.200 | 50 | 13.7 | $1.3 \times 10^4$ | 5.4 |
| 32* | 84.000 | 15.000 | 1.000 | 54 | 16.7 | $9.0 \times 10^3$ | 6.4 |
| 33* | 75.000 | 15.000 | 10.000 | 79 | 14.5 | $7.0 \times 10^3$ | 8.1 |
| 34* | 70.000 | 15.000 | 15.000 | 112 | 9.6 | $4.0 \times 10^3$ | 15.2 |

*Comparison sample

TABLE 10

| Sample No. | Composition ratio (mol %) | | | Characteristics | | | |
|---|---|---|---|---|---|---|---|
| | $SrTiO_3$ | $Ta_2O_5$ | $La_2O_3$ | $V_1mA$ (V/mm) | $\alpha$ | $\epsilon$ | $\tan \delta$ (%) |
| 1* | 99.995 | 0 | 0.005 | 90 | 1.0 | $4.0 \times 10^3$ | 36.4 |
| 2* | 99.800 | 0 | 0.200 | 96 | 1.3 | $4.0 \times 10^3$ | 39.2 |
| 3* | 99.000 | 0 | 1.000 | 112 | 1.4 | $6.0 \times 10^3$ | 41.5 |
| 4* | 90.000 | 0 | 10.000 | 184 | 1.9 | $8.0 \times 10^3$ | 56.9 |
| 5* | 99.995 | 0.005 | 0 | 78 | 3.3 | $5.0 \times 10^3$ | 8.6 |
| 6 | 99.990 | 0.005 | 0.005 | 70 | 9.1 | $7.0 \times 10^3$ | 5.0 |
| 7 | 99.795 | 0.005 | 0.200 | 57 | 9.3 | $1.0 \times 10^4$ | 3.4 |
| 8 | 98.795 | 0.005 | 1.000 | 61 | 10.8 | $1.3 \times 10^4$ | 3.4 |
| 9 | 89.995 | 0.005 | 10.000 | 75 | 11.4 | $1.7 \times 10^4$ | 4.5 |
| 10* | 84.995 | 0.005 | 15.000 | 79 | 11.3 | $2.0 \times 10^4$ | 8.9 |
| 11* | 99.800 | 0.200 | 0 | 72 | 4.3 | $7.0 \times 10^3$ | 5.1 |
| 12 | 99.795 | 0.200 | 0.005 | 63 | 9.6 | $1.0 \times 10^4$ | 2.5 |
| 13 | 99.600 | 0.200 | 0.200 | 49 | 11.5 | $1.8 \times 10^4$ | 2.4 |
| 14 | 98.800 | 0.200 | 1.000 | 54 | 14.6 | $2.0 \times 10^4$ | 3.2 |
| 15 | 89.800 | 0.200 | 10.000 | 69 | 15.3 | $2.6 \times 10^4$ | 4.6 |
| 16* | 84.800 | 0.200 | 15.000 | 85 | 15.1 | $2.7 \times 10^4$ | 8.5 |

TABLE 10-continued

| Sample No. | Composition ratio (mol %) | | | Characteristics | | | |
|---|---|---|---|---|---|---|---|
| | $SrTiO_3$ | $Ta_2O_5$ | $La_2O_3$ | $V_1mA$ (V/mm) | $\alpha$ | $\epsilon$ | $\tan \delta$ (%) |
| 17* | 99.000 | 1.000 | 0 | 69 | 5.5 | $9.0 \times 10^3$ | 7.0 |
| 18 | 98.995 | 1.000 | 0.005 | 52 | 12.2 | $1.0 \times 10^4$ | 2.5 |
| 19 | 98.800 | 1.000 | 0.200 | 43 | 14.6 | $1.7 \times 10^4$ | 3.7 |
| 20 | 98.000 | 1.000 | 1.000 | 53 | 18.9 | $2.1 \times 10^4$ | 3.1 |
| 21 | 89.000 | 1.000 | 10.000 | 60 | 19.0 | $2.3 \times 10^4$ | 3.2 |
| 22* | 84.000 | 1.000 | 15.000 | 89 | 19.2 | $1.1 \times 10^4$ | 9.8 |
| 23* | 90.000 | 10.000 | 0 | 61 | 6.3 | $9.0 \times 10^3$ | 8.4 |
| 24 | 89.995 | 10.000 | 0.005 | 51 | 12.7 | $1.7 \times 10^4$ | 3.2 |
| 25 | 89.800 | 10.000 | 0.200 | 42 | 14.3 | $2.2 \times 10^4$ | 3.5 |
| 26 | 89.000 | 10.000 | 1.000 | 55 | 15.9 | $2.6 \times 10^4$ | 4.8 |
| 27 | 80.000 | 10.000 | 10.000 | 67 | 17.8 | $2.3 \times 10^4$ | 4.3 |
| 28* | 75.000 | 10.000 | 15.000 | 110 | 17.5 | $1.9 \times 10^4$ | 13.0 |
| 29* | 85.000 | 15.000 | 0 | 74 | 6.6 | $7.0 \times 10^3$ | 9.7 |
| 30* | 84.995 | 15.000 | 0.005 | 72 | 11.0 | $8.0 \times 10^3$ | 7.9 |
| 31* | 84.800 | 15.000 | 0.200 | 71 | 12.1 | $8.0 \times 10^3$ | 8.8 |
| 32* | 84.000 | 15.000 | 1.000 | 78 | 14.0 | $9.0 \times 10^3$ | 10.7 |
| 33* | 75.000 | 15.000 | 10.000 | 97 | 12.2 | $7.0 \times 10^3$ | 15.2 |
| 34* | 70.000 | 15.000 | 15.000 | 136 | 8.3 | $4.0 \times 10^3$ | 24.6 |

*Comparison sample

EXAMPLE 11

$SrTiO_3$, $Ta_2O_5$ and $Y_2O_3$ are made in composition ratios shown in Table 11, and mixing, forming and firing are made in the similar operations as those of the above-mentioned EXAMPLE 8, and measured results made under the similar condition are shown in Table 11.

EXAMPLE 12

$SrTiO_3$, $Ta_2O_5$ and $Gd_2O_3$ are made in composition ratios shown in Table 12, and mixing, forming and firing are made in the similar operations as those of the above-mentioned EXAMPLE 8, and measured results made under the similar condition are shown in Table 12.

TABLE 11

| Sample No. | Composition ratio (mol %) | | | Characteristics | | | |
|---|---|---|---|---|---|---|---|
| | $SrTiO_3$ | $Ta_2O_5$ | $Y_2O_3$ | $V_1mA$ (V/mm) | $\alpha$ | $\epsilon$ | $\tan \delta$ (%) |
| 1* | 99.995 | 0 | 0.005 | 81 | 1.0 | $4.0 \times 10^3$ | 34.6 |
| 2* | 99.800 | 0 | 0.200 | 106 | 1.3 | $4.0 \times 10^3$ | 38.2 |
| 3* | 99.000 | 0 | 1.000 | 160 | 1.4 | $6.0 \times 10^3$ | 40.5 |
| 4* | 90.000 | 0 | 10.000 | 172 | 1.7 | $7.0 \times 10^3$ | 46.8 |
| 5* | 99.995 | 0.005 | 0 | 78 | 3.3 | $5.0 \times 10^3$ | 8.6 |
| 6 | 99.990 | 0.005 | 0.005 | 87 | 9.0 | $1.0 \times 10^4$ | 5.3 |
| 7 | 99.795 | 0.005 | 0.200 | 81 | 9.4 | $1.6 \times 10^4$ | 3.8 |
| 8 | 98.995 | 0.005 | 1.000 | 86 | 10.9 | $1.9 \times 10^4$ | 2.9 |
| 9 | 89.995 | 0.005 | 10.000 | 95 | 11.3 | $2.6 \times 10^4$ | 2.2 |
| 10* | 84.995 | 0.005 | 15.000 | 107 | 11.5 | $2.1 \times 10^4$ | 7.3 |
| 11* | 99.800 | 0.200 | 0 | 72 | 4.3 | $7.0 \times 10^3$ | 5.1 |
| 12 | 99.795 | 0.200 | 0.005 | 70 | 9.2 | $1.5 \times 10^4$ | 3.5 |
| 13 | 99.600 | 0.200 | 0.200 | 59 | 10.7 | $2.6 \times 10^4$ | 2.0 |
| 14 | 98.800 | 0.200 | 1.000 | 52 | 13.7 | $3.0 \times 10^4$ | 2.7 |
| 15 | 89.800 | 0.200 | 10.000 | 61 | 15.2 | $3.1 \times 10^4$ | 2.9 |
| 16* | 84.800 | 0.200 | 15.000 | 70 | 15.0 | $2.7 \times 10^4$ | 8.7 |
| 17* | 99.000 | 1.000 | 0 | 69 | 5.5 | $9.0 \times 10^3$ | 7.0 |
| 18 | 98.995 | 1.000 | 0.005 | 67 | 12.1 | $1.6 \times 10^4$ | 2.8 |
| 19 | 98.800 | 1.000 | 0.200 | 54 | 13.9 | $2.2 \times 10^4$ | 2.1 |
| 20 | 98.000 | 1.000 | 1.000 | 58 | 18.2 | $2.7 \times 10^4$ | 2.9 |
| 21 | 89.000 | 1.000 | 10.000 | 65 | 18.9 | $2.3 \times 10^4$ | 3.9 |
| 22* | 84.000 | 1.000 | 15.000 | 98 | 19.1 | $1.1 \times 10^4$ | 8.6 |
| 23* | 90.000 | 10.000 | 0 | 61 | 6.3 | $9.0 \times 10^3$ | 8.4 |
| 24 | 89.995 | 10.000 | 0.005 | 57 | 11.7 | $1.7 \times 10^4$ | 3.8 |
| 25 | 89.800 | 10.000 | 0.200 | 48 | 13.4 | $2.0 \times 10^4$ | 2.4 |
| 26 | 89.000 | 10.000 | 1.000 | 56 | 15.0 | $2.5 \times 10^4$ | 3.8 |
| 27 | 80.000 | 10.000 | 10.000 | 73 | 17.1 | $2.5 \times 10^4$ | 3.9 |
| 28* | 75.000 | 10.000 | 15.000 | 109 | 17.0 | $1.9 \times 10^4$ | 9.3 |
| 29* | 85.000 | 15.000 | 0 | 74 | 6.6 | $7.0 \times 10^3$ | 9.7 |
| 30* | 84.995 | 15.000 | 0.005 | 70 | 10.9 | $8.0 \times 10^3$ | 7.7 |
| 31* | 84.800 | 15.000 | 0.200 | 68 | 11.5 | $9.0 \times 10^3$ | 8.4 |
| 32* | 84.000 | 15.000 | 1.000 | 78 | 13.7 | $9.0 \times 10^3$ | 10.6 |
| 33* | 75.000 | 15.000 | 10.000 | 101 | 10.2 | $8.0 \times 10^3$ | 13.6 |
| 34* | 70.000 | 15.000 | 15.000 | 139 | 7.3 | $5.0 \times 10^3$ | 23.9 |

*Comparison sample

TABLE 12

| Sample No. | Composition ratio (mol %) | | | Characteristics | | | |
|---|---|---|---|---|---|---|---|
| | $SrTiO_3$ | $Ta_2O_5$ | $Gd_2O_3$ | $V_1mA$ (V/mm) | $\alpha$ | $\epsilon$ | $\tan \delta$ (%) |
| 1* | 99.995 | 0 | 0.005 | 101 | 1.0 | $4.0 \times 10^3$ | 44.6 |
| 2* | 99.800 | 0 | 0.200 | 105 | 1.6 | $4.0 \times 10^3$ | 39.1 |
| 3* | 99.000 | 0 | 1.000 | 173 | 2.0 | $7.0 \times 10^3$ | 31.3 |
| 4* | 90.000 | 0 | 10.000 | 213 | 2.4 | $7.0 \times 10^3$ | 26.0 |

TABLE 12-continued

| Sample No. | Composition ratio (mol %) | | | Characteristics | | | |
|---|---|---|---|---|---|---|---|
| | SrTiO$_3$ | Ta$_2$O$_5$ | Gd$_2$O$_3$ | V$_1$mA (V/mm) | α | ε | tan δ (%) |
| 5* | 99.995 | 0.005 | 0 | 78 | 3.3 | 5.0 × 10$^3$ | 8.6 |
| 6 | 99.990 | 0.005 | 0.005 | 82 | 6.7 | 7.0 × 10$^3$ | 4.5 |
| 7 | 99.795 | 0.005 | 0.200 | 80 | 9.0 | 1.1 × 10$^4$ | 3.6 |
| 8 | 98.995 | 0.005 | 1.000 | 87 | 13.7 | 1.5 × 10$^4$ | 2.7 |
| 9 | 89.995 | 0.005 | 10.000 | 98 | 15.0 | 1.9 × 10$^4$ | 3.2 |
| 10* | 84.995 | 0.005 | 15.000 | 112 | 15.5 | 2.2 × 10$^4$ | 6.8 |
| 11* | 99.800 | 0.200 | 0 | 72 | 4.3 | 7.0 × 10$^3$ | 5.1 |
| 12 | 99.795 | 0.200 | 0.005 | 80 | 7.1 | 1.1 × 10$^4$ | 3.0 |
| 13 | 99.600 | 0.200 | 0.200 | 72 | 11.0 | 1.6 × 10$^4$ | 2.5 |
| 14 | 98.800 | 0.200 | 1.000 | 81 | 14.5 | 2.0 × 10$^4$ | 2.0 |
| 15 | 89.800 | 0.200 | 10.000 | 89 | 15.2 | 2.8 × 10$^4$ | 2.7 |
| 16* | 84.800 | 0.200 | 15.000 | 98 | 15.9 | 2.9 × 10$^4$ | 7.4 |
| 17* | 99.000 | 1.000 | 0 | 69 | 5.5 | 9.0 × 10$^3$ | 7.0 |
| 18 | 98.995 | 1.000 | 0.005 | 87 | 10.1 | 1.6 × 10$^4$ | 2.5 |
| 19 | 98.800 | 1.000 | 0.200 | 63 | 12.3 | 1.7 × 10$^4$ | 2.3 |
| 20 | 98.000 | 1.000 | 1.000 | 68 | 13.2 | 2.3 × 10$^4$ | 2.9 |
| 21 | 89.000 | 1.000 | 10.000 | 74 | 14.9 | 1.9 × 10$^4$ | 3.1 |
| 22* | 84.000 | 1.000 | 15.000 | 103 | 12.3 | 1.4 × 10$^4$ | 8.6 |
| 23* | 90.000 | 10.000 | 0 | 61 | 6.3 | 9.0 × 10$^3$ | 8.4 |
| 24 | 89.995 | 10.000 | 0.005 | 65 | 12.5 | 1.8 × 10$^4$ | 3.6 |
| 25 | 89.800 | 10.000 | 0.200 | 57 | 13.1 | 2.3 × 10$^4$ | 2.0 |
| 26 | 89.000 | 10.000 | 1.000 | 68 | 13.9 | 2.6 × 10$^4$ | 3.5 |
| 27 | 80.000 | 10.000 | 10.000 | 83 | 12.8 | 2.5 × 10$^4$ | 3.7 |
| 28* | 75.000 | 10.000 | 15.000 | 114 | 10.8 | 2.0 × 10$^4$ | 9.1 |
| 29* | 85.000 | 15.000 | 0 | 74 | 6.6 | 7.0 × 10$^3$ | 9.7 |
| 30* | 84.995 | 15.000 | 0.005 | 84 | 8.4 | 8.0 × 10$^3$ | 6.6 |
| 31* | 84.800 | 15.000 | 0.200 | 79 | 8.0 | 9.0 × 10$^3$ | 8.3 |
| 32* | 84.000 | 15.000 | 1.000 | 85 | 7.6 | 9.0 × 10$^3$ | 10.2 |
| 33* | 75.000 | 15.000 | 10.000 | 114 | 7.5 | 8.0 × 10$^3$ | 14.6 |
| 34* | 70.000 | 15.000 | 15.000 | 148 | 4.6 | 5.0 × 10$^3$ | 25.7 |

*Comparison sample

As shown by EXAMPLEs 8 through 12, Ta$_2$O$_5$ with its added value in a range of 0.005–10.000 mol %, contributes to reduce specific resistance of the reduced fired body, and by re-firing in air it shows baristor characteristics.

This is because that granules and grain boundaries of fired body obtained by the reduced firing is of low resistances, and by re-firing in the air only crystal boundaries become to high resistance thereby forming electric barriers.

However, when only Ta$_2$O$_5$ is added, the electric barrier formed at the grain boundaries are small, and the baristor characteristics are relatively small.

Accordingly, by adding additives such as CdO, BaO, La$_2$O$_3$, Y$_2$O$_3$, Gd$_2$O$_3$, the additive is segregated at the grain boundaries during the reduced firing, and by re-firing in the air such additive forms large electric barrier at the grain boundary, thereby making the baristor characteristics large.

And, by making the crystal grain boundary only in high resistance, capacitance characteristics is presented between crystal granule—crystal grain boundaries—crystal granules.

Accordingly, by adding Ta$_2$O$_5$ and additive S such as CdO, BaO, La$_2$O$_3$, Y$_2$O$_3$, Gd$_2$O$_3$, to SrTiO$_3$, it is possible to provide a characteristic combining the aristor characteristics and the capacitance characteristics.

The case such effect is presented is within a range that Ta$_2$O$_5$ is 0.005–10.000 mol %, CdO, BaO, La$_2$O$_3$, Y$_2$O$_3$, Gd$_2$O$_3$, are 0.005–10.000 mol %.

Though in the above-mentioned EXAMPLES 18–24, the elucidation was made for the cases where an additive was added in a single one, it was confirmed that when in place of the above-mentioned, an oxide of Ca, In, Cs, Sn, Sb, W, Pt, Tl, Eu, Tb, Tm, Lu, Th, Ir, Os, Hf and Ru as single one in a range of the above-mentioned predetermined amount was added, the similar effect was obtained.

Besides, it was confirmed that the same effect was obtained even when two kinds or more of oxides of these Ca, Cd, In, Ba, La, Y, Cs, Sn, Sb, W, Pt, Tl, Eu, Gd, Tb, Tm, Lu, Th, Ir, Os, Hf and Ru were used so that total added amount is within the above-mentioned range.

EXAMPLE 13

After measuring SrTiO$_3$, extremely small amount of Nb$_2$O$_5$ which was existing from the initial stage of material (Nb$_2$O$_5$ content in the material used in the present example was 0.050 mol %), Ta$_2$O$_5$ as oxide of metal for acceleration of semiconductorization and CdO as element to improve non-linearity to become composition ratios shown in the below-mentioned TABLE 13, they were mixed and ground and dried, and thereafter calcinated at 1000° C. for 4 hours. Thereafter, it was ground in wet method by ball mill or the like for 4 hours, and dried, and subsequently, after granulating adding 8 wt % of an organic binder (for instance, polyvinylalcohol), press-formed into a shape of disc of 8.0 φ (mm) × 1.0 t (mm) with forming pressure of about 1.0 t/cm$^2$. The formed body was fired for 4 hours in a reducing atmosphere (for instance, N$_2$:H$_2$=1:1, flow rate is 1.0 l/min) and at 1350° C. Specific resistance of the fired body thus obtained was averagely 0.3 Ω.cm, and average granule size was 30 μm.

Nextly, the above-mentioned fired body was baked in the air for 2 hours at 1300° C. to obtain a sintered body 4 of FIG. 3. And both faces of the above-mentioned sintered body 4 are ground by using an abrasive such as SiC or the like, as Ag on the ground faces. Sizes of the electrodes 5, 6 are circle of 5.0 φ (mm).

Characteristic of the devices thus obtained are shown in TABLE 13.

TABLE 25

| Sample No. | Composition ratio (mol %) SrTiO$_3$ | Nb$_2$O$_5$ | Ta$_2$O$_5$ | CdO | Characteristics V$_1$mA/mm (V) | α | ε | tan δ (%) |
|---|---|---|---|---|---|---|---|---|
| 1* | 99.945 | 0.050 | 0 | 0.005 | 75 | 1.0 | 4.0 × 10$^3$ | 35.2 |
| 2* | 99.750 | 0.050 | 0 | 0.200 | 80 | 1.3 | 4.0 × 10$^3$ | 36.0 |
| 3* | 98.950 | 0.050 | 0 | 1.000 | 96 | 1.6 | 4.0 × 10$^3$ | 44.3 |
| 4* | 89.950 | 0.050 | 0 | 10.000 | 164 | 2.1 | 5.0 × 10$^3$ | 56.7 |
| 5* | 99.945 | 0.050 | 0.005 | 0 | 80 | 3.0 | 5.0 × 10$^3$ | 8.6 |
| 6 | 99.940 | 0.050 | 0.005 | 0.005 | 65 | 8.5 | 6.0 × 10$^3$ | 6.4 |
| 7 | 99.745 | 0.050 | 0.005 | 0.200 | 56 | 9.8 | 1.3 × 10$^4$ | 3.6 |
| 8 | 98.945 | 0.050 | 0.005 | 1.000 | 62 | 10.6 | 1.3 × 10$^4$ | 4.1 |
| 9 | 89.945 | 0.050 | 0.005 | 10.000 | 65 | 13.5 | 1.7 × 10$^4$ | 4.4 |
| 10* | 84.945 | 0.050 | 0.005 | 15.000 | 78 | 11.5 | 1.0 × 10$^4$ | 9.8 |
| 11* | 99.750 | 0.050 | 0.200 | 0 | 75 | 3.4 | 5.0 × 10$^3$ | 5.2 |
| 12 | 99.745 | 0.050 | 0.200 | 0.005 | 56 | 8.9 | 1.0 × 10$^4$ | 2.3 |
| 13 | 99.550 | 0.050 | 0.200 | 0.200 | 42 | 11.0 | 1.2 × 10$^4$ | 2.8 |
| 14 | 98.750 | 0.050 | 0.200 | 1.000 | 46 | 13.1 | 1.5 × 10$^4$ | 3.0 |
| 15 | 89.750 | 0.050 | 0.200 | 10.000 | 57 | 14.1 | 1.9 × 10$^4$ | 4.5 |
| 16* | 84.750 | 0.050 | 0.200 | 15.000 | 78 | 12.5 | 1.1 × 10$^4$ | 9.7 |
| 17* | 98.950 | 0.050 | 1.000 | 0 | 71 | 4.5 | 6.0 × 10$^4$ | 6.0 |
| 18 | 98.945 | 0.050 | 1.000 | 0.005 | 43 | 10.9 | 2.0 × 10$^4$ | 2.5 |
| 19 | 98.750 | 0.050 | 1.000 | 0.200 | 34 | 13.0 | 2.2 × 10$^4$ | 3.6 |
| 20 | 97.950 | 0.050 | 1.000 | 1.000 | 41 | 16.4 | 2.3 × 10$^4$ | 3.3 |
| 21 | 88.950 | 0.050 | 1.000 | 10.000 | 51 | 18.0 | 1.5 × 10$^4$ | 4.5 |
| 22* | 83.950 | 0.050 | 1.000 | 15.000 | 80 | 15.9 | 1.0 × 10$^4$ | 11.0 |
| 23* | 89.950 | 0.050 | 10.000 | 0 | 61 | 4.8 | 6.0 × 10$^3$ | 7.0 |
| 24 | 89.945 | 0.050 | 10.000 | 0.005 | 41 | 11.3 | 1.2 × 10$^4$ | 3.3 |
| 25 | 89.750 | 0.050 | 10.000 | 0.200 | 32 | 13.1 | 1.7 × 10$^4$ | 3.6 |
| 26 | 88.950 | 0.050 | 10.000 | 1.000 | 43 | 14.9 | 1.9 × 10$^4$ | 4.3 |
| 27 | 79.950 | 0.050 | 10.000 | 10.000 | 57 | 15.1 | 1.7 × 10$^4$ | 4.1 |
| 28* | 74.950 | 0.050 | 10.000 | 15.000 | 98 | 12.0 | 1.4 × 10$^4$ | 13.0 |
| 29* | 84.950 | 0.050 | 15.000 | 0 | 79 | 5.1 | 5.0 × 10$^3$ | 7.9 |
| 30* | 84.945 | 0.050 | 15.000 | 0.005 | 67 | 10.0 | 1.1 × 10$^4$ | 6.5 |
| 31* | 84.750 | 0.050 | 15.000 | 0.200 | 65 | 10.3 | 1.1 × 10$^4$ | 7.4 |
| 32* | 83.950 | 0.050 | 15.000 | 1.000 | 74 | 11.8 | 1.0 × 10$^4$ | 10.9 |
| 33* | 74.950 | 0.050 | 15.000 | 10.000 | 90 | 8.9 | 4.0 × 10$^3$ | 16.4 |
| 34* | 69.950 | 0.050 | 15.000 | 15.000 | 174 | 6.1 | 4.0 × 10$^3$ | 27.2 |

*Comparative sample

EXAMPLE 14

SrTiO$_3$, very small amount of Nb$_2$O$_5$ which was existing from initial stage of material (contents of Nb$_2$O$_5$ of the material used in the present example was 0.050 mol %), Ta$_2$O$_5$ as oxide of metal for accelerating semicondoctorization and BaO as an element to improve non-linearity are formed, reduced and fired, and oxidated in the similar operation as that of the above-mentioned EXAMPLE 13. Results obtained by measuring in the similar condition as that of the above-mentioned of the characteristics of devices thus obtained were shown in TABLE 14.

TABLE 14

| Sample No. | Composition ratio (mol %) SrTiO$_3$ | Nb$_2$O$_5$ | Ta$_2$O$_5$ | BaO | Characteristics V$_1$mA/mm (V) | α | ε | tan δ (%) |
|---|---|---|---|---|---|---|---|---|
| 1* | 99.945 | 0.050 | 0 | 0.005 | 84 | 1.0 | 4.0 × 10$^3$ | 35.4 |
| 2* | 99.750 | 0.050 | 0 | 0.200 | 88 | 1.4 | 4.0 × 10$^3$ | 36.4 |
| 3* | 98.950 | 0.050 | 0 | 1.000 | 105 | 1.5 | 4.0 × 10$^3$ | 42.5 |
| 4* | 89.950 | 0.050 | 0 | 10.000 | 170 | 1.7 | 5.0 × 10$^3$ | 47.0 |
| 5* | 99.945 | 0.050 | 0.005 | 0 | 80 | 3.0 | 5.0 × 10$^3$ | 8.6 |
| 6 | 99.940 | 0.050 | 0.005 | 0.005 | 62 | 8.6 | 7.0 × 10$^3$ | 6.3 |
| 7 | 99.745 | 0.050 | 0.005 | 0.200 | 51 | 9.8 | 9.0 × 10$^3$ | 3.4 |
| 8 | 98.945 | 0.050 | 0.005 | 1.000 | 57 | 10.6 | 1.7 × 10$^4$ | 3.9 |
| 9 | 89.945 | 0.050 | 0.005 | 10.000 | 60 | 11.9 | 1.9 × 10$^4$ | 4.8 |
| 10* | 84.945 | 0.050 | 0.005 | 15.000 | 72 | 11.5 | 1.4 × 10$^4$ | 9.5 |
| 11* | 99.750 | 0.050 | 0.200 | 0 | 75 | 3.4 | 5 × 10$^3$ | 5.2 |
| 12 | 99.745 | 0.050 | 0.200 | 0.005 | 56 | 9.0 | 1.4 × 10$^4$ | 2.7 |
| 13 | 99.550 | 0.050 | 0.200 | 0.200 | 39 | 10.1 | 1.6 × 10$^4$ | 2.5 |
| 14 | 98.750 | 0.050 | 0.200 | 1.000 | 45 | 11.1 | 2.0 × 10$^4$ | 2.1 |
| 15 | 89.750 | 0.050 | 0.200 | 10.000 | 54 | 12.3 | 1.8 × 10$^4$ | 3.2 |
| 16* | 84.750 | 0.050 | 0.200 | 15.000 | 73 | 13.8 | 1.5 × 10$^4$ | 8.9 |
| 17* | 98.950 | 0.050 | 1.000 | 0 | 71 | 4.5 | 6.0 × 10$^3$ | 6.0 |
| 18 | 98.945 | 0.050 | 1.000 | 0.005 | 42 | 10.7 | 1.8 × 10$^4$ | 2.8 |
| 19 | 98.750 | 0.050 | 1.000 | 0.200 | 25 | 11.7 | 2.0 × 10$^4$ | 2.7 |
| 20 | 97.950 | 0.050 | 1.000 | 1.000 | 38 | 12.6 | 2.1 × 10$^4$ | 3.8 |
| 21 | 88.950 | 0.050 | 1.000 | 10.000 | 45 | 13.3 | 1.8 × 10$^4$ | 4.1 |
| 22* | 83.950 | 0.050 | 1.000 | 15.000 | 80 | 13.0 | 1.5 × 10$^4$ | 11.5 |
| 23* | 89.950 | 0.050 | 10.000 | 0 | 61 | 4.8 | 6.0 × 10$^3$ | 7.0 |
| 24 | 89.945 | 0.050 | 10.000 | 0.005 | 39 | 10.5 | 1.5 × 10$^4$ | 3.5 |
| 25 | 89.750 | 0.050 | 10.000 | 0.200 | 25 | 11.2 | 1.8 × 10$^4$ | 3.6 |
| 26 | 88.950 | 0.050 | 10.000 | 1.000 | 38 | 12.2 | 1.7 × 10$^4$ | 3.9 |
| 27 | 79.950 | 0.050 | 10.000 | 10.000 | 50 | 13.0 | 1.6 × 10$^4$ | 7.0 |
| 28* | 74.950 | 0.050 | 10.000 | 15.000 | 89 | 14.1 | 1.2 × 10$^4$ | 11.7 |
| 29* | 84.950 | 0.050 | 15.000 | 0 | 79 | 5.1 | 5.0 × 10$^3$ | 7.9 |
| 30* | 84.945 | 0.050 | 15.000 | 0.005 | 56 | 10.5 | 1.1 × 10$^4$ | 5.0 |

TABLE 14-continued

| Sample No. | Composition ratio (mol %) | | | | Characteristics | | | |
|---|---|---|---|---|---|---|---|---|
| | $SrTiO_3$ | $Nb_2O_5$ | $Ta_2O_5$ | BaO | $V_1mA/mm$ (V) | α | ε | tan δ (%) |
| 31* | 84.750 | 0.050 | 15.000 | 0.200 | 55 | 11.7 | $1.0 \times 10^4$ | 5.2 |
| 32* | 83.950 | 0.050 | 15.000 | 1.000 | 59 | 11.9 | $8.0 \times 10^3$ | 6.1 |
| 33* | 74.950 | 0.050 | 15.000 | 10.000 | 89 | 11.8 | $5.0 \times 10^3$ | 7.8 |
| 34* | 69.950 | 0.050 | 15.000 | 15.000 | 121 | 6.1 | $4.0 \times 10^3$ | 15.0 |

*Comparison sample

EXAMPLE 15

$SrTiO_3$, very small amount of $Nb_2O_5$ which was existing from initial stage of material (contents of $Nb_2O_5$ of the material used in the present example was 0.050 mol %), $Ta_2O_5$ as oxide of metal for accelerating semicondoctorization and $La_2O_3$ as an element to improve non-linearity are formed, reduced and fired, and oxidated in the similar operation as that of the above-mentioned EXAMPLE 13. Results obtained by measuring in the similar condition as that of the above-mentioned of the characteristics of devices thus obtained were shown in TABLE 15.

EXAMPLE 16

$SrTiO_3$, very small amount of $Nb_2O_5$ which was existing from initial stage of material (contents of $Nb_2O_5$ of the material used in the present example was 0.050 mol %), $Ta_2O_5$ as oxide of metal for accelerating semicondoctorization and $Y_2O_3$ as an element to improve non-linearity are formed, reduced and fired, and oxidated in the similar operation as that of the above-mentioned EXAMPLE 13. Results obtained by measuring in the similar condition as that of the above-mentioned of the characteristics of devices thus obtained were shown in TABLE 16.

TABLE 15

| Sample No. | Composition ratio (mol %) | | | | Characteristics | | | |
|---|---|---|---|---|---|---|---|---|
| | $SrTiO_3$ | $Nb_2O_5$ | $Ta_2O_5$ | $La_2O_3$ | $V_1mA/mm$ (V) | α | ε | tan δ (%) |
| 1* | 99.945 | 0.050 | 0 | 0.005 | 90 | 1.0 | $4.0 \times 10^3$ | 35.4 |
| 2* | 99.750 | 0.050 | 0 | 0.200 | 96 | 1.2 | $4.0 \times 10^3$ | 39.0 |
| 3* | 98.950 | 0.050 | 0 | 1.000 | 113 | 1.3 | $5.0 \times 10^3$ | 40.5 |
| 4* | 89.950 | 0.050 | 0 | 10.000 | 186 | 1.7 | $7.0 \times 10^3$ | 56.8 |
| 5* | 99.945 | 0.050 | 0.005 | 0 | 80 | 3.0 | $5.0 \times 10^3$ | 8.6 |
| 6 | 99.940 | 0.050 | 0.005 | 0.005 | 72 | 8.2 | $7.0 \times 10^3$ | 5.1 |
| 7 | 99.745 | 0.050 | 0.005 | 0.200 | 59 | 8.5 | $1.0 \times 10^4$ | 3.0 |
| 8 | 98.945 | 0.050 | 0.005 | 1.000 | 63 | 9.8 | $1.4 \times 10^4$ | 3.1 |
| 9 | 89.945 | 0.050 | 0.005 | 10.000 | 77 | 10.4 | $1.8 \times 10^4$ | 4.2 |
| 10* | 84.945 | 0.050 | 0.005 | 15.000 | 81 | 10.3 | $1.5 \times 10^4$ | 9.8 |
| 11* | 99.750 | 0.050 | 0.200 | 0 | 75 | 3.4 | $5.0 \times 10^3$ | 5.2 |
| 12 | 99.745 | 0.050 | 0.200 | 0.005 | 65 | 8.6 | $1.0 \times 10^4$ | 3.1 |
| 13 | 99.550 | 0.050 | 0.200 | 0.200 | 51 | 10.9 | $1.8 \times 10^4$ | 2.7 |
| 14 | 98.750 | 0.050 | 0.200 | 1.000 | 54 | 13.2 | $2.0 \times 10^4$ | 3.0 |
| 15 | 89.750 | 0.050 | 0.200 | 10.000 | 69 | 14.3 | $2.2 \times 10^4$ | 3.2 |
| 16* | 84.750 | 0.050 | 0.200 | 15.000 | 87 | 14.0 | $2.3 \times 10^4$ | 8.4 |
| 17* | 98.950 | 0.050 | 1.000 | 0 | 71 | 4.5 | $6.0 \times 10^3$ | 6.0 |
| 18 | 98.945 | 0.050 | 1.000 | 0.005 | 53 | 11.2 | $1.0 \times 10^4$ | 2.9 |
| 19 | 98.750 | 0.050 | 1.000 | 0.200 | 45 | 13.6 | $1.6 \times 10^4$ | 3.5 |
| 20 | 97.950 | 0.050 | 1.000 | 1.000 | 55 | 16.4 | $2.0 \times 10^4$ | 3.0 |
| 21 | 88.950 | 0.050 | 1.000 | 10.000 | 62 | 16.5 | $2.1 \times 10^4$ | 3.2 |
| 22* | 83.950 | 0.050 | 1.000 | 15.000 | 91 | 17.0 | $1.5 \times 10^4$ | 9.9 |
| 23* | 89.950 | 0.050 | 10.000 | 0 | 61 | 4.8 | $6.0 \times 10^3$ | 7.0 |
| 24 | 89.945 | 0.050 | 10.000 | 0.005 | 51 | 10.7 | $1.2 \times 10^4$ | 3.2 |
| 25 | 89.750 | 0.050 | 10.000 | 0.200 | 43 | 12.3 | $1.7 \times 10^4$ | 3.5 |
| 26 | 88.950 | 0.050 | 10.000 | 1.000 | 57 | 13.9 | $2.1 \times 10^4$ | 4.8 |
| 27 | 79.950 | 0.050 | 10.000 | 10.000 | 69 | 13.8 | $2.0 \times 10^4$ | 6.1 |
| 28* | 74.950 | 0.050 | 10.000 | 15.000 | 120 | 13.5 | $1.8 \times 10^4$ | 11.0 |
| 29* | 84.950 | 0.050 | 15.000 | 0 | 79 | 5.1 | $5.0 \times 10^3$ | 7.9 |
| 30* | 84.945 | 0.050 | 15.000 | 0.005 | 75 | 10.0 | $8.0 \times 10^3$ | 7.5 |
| 31* | 84.750 | 0.050 | 15.000 | 0.200 | 74 | 11.1 | $8.0 \times 10^3$ | 7.6 |
| 32* | 83.950 | 0.050 | 15.000 | 1.000 | 79 | 12.0 | $7.0 \times 10^3$ | 8.1 |
| 33* | 74.950 | 0.050 | 15.000 | 10.000 | 102 | 11.2 | $7.0 \times 10^3$ | 10.2 |
| 34* | 69.950 | 0.050 | 15.000 | 15.000 | 143 | 7.9 | $5.0 \times 10^3$ | 14.6 |

*Comparison sample

TABLE 16

| Sample No. | Composition ratio (mol %) | | | | Characteristics | | | |
|---|---|---|---|---|---|---|---|---|
| | $SrTiO_3$ | $Nb_2O_5$ | $Ta_2O_5$ | $Y_2O_3$ | $V_1mA/mm$ (V) | α | ε | tan δ (%) |
| 1* | 99.945 | 0.050 | 0 | 0.005 | 82 | 1.0 | $4.0 \times 10^3$ | 35.6 |
| 2* | 99.750 | 0.050 | 0 | 0.200 | 107 | 1.3 | $4.0 \times 10^3$ | 39.2 |
| 3* | 98.950 | 0.050 | 0 | 1.000 | 161 | 1.4 | $4.0 \times 10^3$ | 41.5 |
| 4* | 89.950 | 0.050 | 0 | 10.000 | 175 | 1.5 | $7.0 \times 10^3$ | 47.8 |
| 5* | 99.945 | 0.050 | 0.005 | 0 | 80 | 3.0 | $5.0 \times 10^3$ | 8.6 |
| 6 | 99.940 | 0.050 | 0.005 | 0.005 | 89 | 8.0 | $1.0 \times 10^4$ | 5.3 |
| 7 | 99.745 | 0.050 | 0.005 | 0.200 | 83 | 9.0 | $1.5 \times 10^4$ | 3.8 |
| 8 | 98.945 | 0.050 | 0.005 | 1.000 | 88 | 9.4 | $1.9 \times 10^4$ | 3.4 |
| 9 | 89.945 | 0.050 | 0.005 | 10.000 | 97 | 10.9 | $2.1 \times 10^4$ | 3.0 |
| 10* | 84.945 | 0.050 | 0.005 | 15.000 | 111 | 11.3 | $2.0 \times 10^4$ | 7.4 |

TABLE 16-continued

| Sample No. | Composition ratio (mol %) | | | | Characteristics | | | |
|---|---|---|---|---|---|---|---|---|
| | $SrTiO_3$ | $Nb_2O_5$ | $Ta_2O_5$ | $Y_2O_3$ | $V_{1mA}/mm$ (V) | $\alpha$ | $\epsilon$ | $\tan\delta$ (%) |
| 11* | 99.750 | 0.050 | 0.200 | 0 | 75 | 3.4 | $5.0 \times 10^3$ | 5.2 |
| 12 | 99.745 | 0.050 | 0.200 | 0.005 | 73 | 8.2 | $1.4 \times 10^4$ | 3.6 |
| 13 | 99.550 | 0.050 | 0.200 | 0.200 | 62 | 9.9 | $1.7 \times 10^4$ | 2.8 |
| 14 | 98.750 | 0.050 | 0.200 | 1.000 | 55 | 11.7 | $2.0 \times 10^4$ | 2.5 |
| 15 | 89.750 | 0.050 | 0.200 | 10.000 | 64 | 13.2 | $2.1 \times 10^4$ | 2.9 |
| 16* | 84.750 | 0.050 | 0.200 | 15.000 | 75 | 13.0 | $2.2 \times 10^4$ | 8.9 |
| 17* | 98.950 | 0.050 | 1.000 | 0 | 71 | 4.5 | $6.0 \times 10^3$ | 6.0 |
| 18 | 98.945 | 0.050 | 1.000 | 0.005 | 69 | 11.0 | $1.5 \times 10^4$ | 2.9 |
| 19 | 98.750 | 0.050 | 1.000 | 0.200 | 58 | 12.5 | $2.0 \times 10^4$ | 2.4 |
| 20 | 97.950 | 0.050 | 1.000 | 1.000 | 60 | 13.2 | $2.2 \times 10^4$ | 2.8 |
| 21 | 88.950 | 0.050 | 1.000 | 10.000 | 67 | 13.7 | $2.3 \times 10^4$ | 3.7 |
| 22* | 83.950 | 0.050 | 1.000 | 15.000 | 101 | 13.1 | $1.7 \times 10^4$ | 8.7 |
| 23* | 89.950 | 0.050 | 10.000 | 0 | 61 | 4.8 | $6.0 \times 10^3$ | 7.0 |
| 24 | 89.945 | 0.050 | 10.000 | 0.005 | 57 | 10.7 | $1.5 \times 10^4$ | 3.7 |
| 25 | 89.750 | 0.050 | 10.000 | 0.200 | 49 | 11.4 | $1.7 \times 10^4$ | 2.5 |
| 26 | 88.950 | 0.050 | 10.000 | 1.000 | 56 | 11.7 | $1.9 \times 10^4$ | 3.9 |
| 27 | 79.950 | 0.050 | 10.000 | 10.000 | 73 | 10.7 | $1.9 \times 10^4$ | 4.1 |
| 28* | 74.950 | 0.050 | 10.000 | 15.000 | 110 | 10.5 | $2.1 \times 10^4$ | 9.5 |
| 29* | 84.950 | 0.050 | 15.000 | 0 | 79 | 5.1 | $5.0 \times 10^3$ | 7.9 |
| 30* | 84.945 | 0.050 | 15.000 | 0.005 | 75 | 9.9 | $8.0 \times 10^3$ | 7.5 |
| 31* | 84.750 | 0.050 | 15.000 | 0.200 | 74 | 10.4 | $8.0 \times 10^3$ | 8.3 |
| 32* | 83.950 | 0.050 | 15.000 | 1.000 | 80 | 11.3 | $9.0 \times 10^3$ | 10.2 |
| 33* | 74.950 | 0.050 | 15.000 | 10.000 | 110 | 10.0 | $9.0 \times 10^3$ | 11.4 |
| 34* | 69.950 | 0.050 | 15.000 | 15.000 | 149 | 7.2 | $7.0 \times 10^3$ | 25.8 |

*Comparison sample

EXAMPLE 17

$SrTiO_3$, very small amount of $Nb_2O_5$ which was existing from initial stage of material (contents of $Nb_2O_5$ of the material used in the present example was 0.050 mol %), $Ta_2O_5$ as oxide of metal for accelerating semicondoctorization and $Gd_2O_3$ as an element to improve non-linearity are formed, reduced and fired, and oxidated in the similar operation as that of the above-mentioned EXAMPLE 13. Results obtained by measuring in the similar condition as that of the above-mentioned of the characteristics of devices thus obtained were shown in TABLE 17.

TABLE 17

| Sample No. | Composition ratio (mol %) | | | | Characteristics | | | |
|---|---|---|---|---|---|---|---|---|
| | $SrTiO_3$ | $Nb_2O_5$ | $Ta_2O_5$ | $Gd_2O_3$ | $V_{1mA}/mm$ (V) | $\alpha$ | $\epsilon$ | $\tan\delta$ (%) |
| 1* | 99.945 | 0.050 | 0 | 0.005 | 105 | 1.0 | $4.0 \times 10^3$ | 45.6 |
| 2* | 99.750 | 0.050 | 0 | 0.200 | 110 | 1.1 | $4.0 \times 10^3$ | 40.1 |
| 3* | 98.950 | 0.050 | 0 | 1.000 | 178 | 1.2 | $5.0 \times 10^3$ | 32.3 |
| 4* | 89.950 | 0.050 | 0 | 10.000 | 218 | 1.6 | $8.0 \times 10^3$ | 29.6 |
| 5* | 99.945 | 0.050 | 0.005 | 0 | 80 | 3.0 | $5.0 \times 10^3$ | 8.6 |
| 6 | 99.940 | 0.050 | 0.005 | 0.005 | 84 | 6.6 | $7.0 \times 10^3$ | 4.5 |
| 7 | 99.745 | 0.050 | 0.005 | 0.200 | 82 | 9.7 | $9.0 \times 10^3$ | 3.6 |
| 8 | 98.945 | 0.050 | 0.005 | 1.000 | 89 | 10.0 | $1.5 \times 10^4$ | 2.6 |
| 9 | 89.945 | 0.050 | 0.205 | 1.000 | 100 | 12.7 | $1.7 \times 10^4$ | 3.2 |
| 10* | 84.945 | 0.050 | 0.205 | 15.000 | 121 | 12.9 | $1.9 \times 10^4$ | 6.9 |
| 11* | 99.750 | 0.050 | 0.200 | 0 | 75 | 3.4 | $5.0 \times 10^3$ | 5.2 |
| 12 | 99.745 | 0.050 | 0.200 | 0.005 | 83 | 7.0 | $1.1 \times 10^4$ | 3.0 |
| 13 | 99.550 | 0.050 | 0.200 | 0.200 | 75 | 9.0 | $1.6 \times 10^4$ | 2.5 |
| 14 | 98.750 | 0.050 | 0.200 | 1.000 | 83 | 10.6 | $2.0 \times 10^4$ | 2.3 |
| 15 | 89.750 | 0.050 | 1.000 | 10.000 | 92 | 11.2 | $2.4 \times 10^4$ | 2.7 |
| 16* | 84.750 | 0.050 | 1.000 | 15.000 | 101 | 11.9 | $2.6 \times 10^4$ | 8.4 |
| 17* | 98.950 | 0.050 | 1.000 | 0 | 71 | 4.5 | $6.0 \times 10^3$ | 6.0 |
| 18 | 98.945 | 0.050 | 1.000 | 0.005 | 89 | 9.1 | $1.3 \times 10^4$ | 2.7 |
| 19 | 98.750 | 0.050 | 1.000 | 0.200 | 65 | 0.3 | $1.4 \times 10^4$ | 2.4 |
| 20 | 97.950 | 0.050 | 1.000 | 1.000 | 70 | 11.2 | $1.8 \times 10^4$ | 2.9 |
| 21 | 88.950 | 0.050 | 1.000 | 10.000 | 76 | 12.9 | $1.9 \times 10^4$ | 3.2 |
| 22* | 83.950 | 0.050 | 1.000 | 15.000 | 106 | 12.3 | $1.7 \times 10^4$ | 9.6 |
| 23* | 89.950 | 0.050 | 10.000 | 0 | 61 | 4.8 | $6.0 \times 10^3$ | 7.0 |
| 24 | 89.945 | 0.050 | 10.000 | 0.005 | 65 | 9.5 | $1.5 \times 10^4$ | 3.5 |
| 25 | 89.750 | 0.050 | 10.000 | 0.200 | 57 | 10.1 | $1.8 \times 10^4$ | 2.3 |
| 26 | 88.950 | 0.050 | 10.000 | 1.000 | 68 | 10.9 | $2.3 \times 10^4$ | 3.4 |
| 27 | 79.950 | 0.050 | 10.000 | 10.000 | 84 | 11.8 | $2.5 \times 10^4$ | 3.7 |
| 28* | 74.950 | 0.050 | 10.000 | 15.000 | 121 | 10.2 | $2.0 \times 10^4$ | 10.1 |
| 29* | 84.950 | 0.050 | 15.000 | 0 | 79 | 5.1 | $5 \times 10^3$ | 7.9 |
| 30* | 84.945 | 0.050 | 15.000 | 0.005 | 89 | 8.5 | $8.0 \times 10^3$ | 6.9 |
| 31* | 84.750 | 0.050 | 15.000 | 0.200 | 84 | 8.1 | $9.0 \times 10^3$ | 8.3 |
| 32* | 83.950 | 0.050 | 15.000 | 1.000 | 90 | 7.7 | $9.0 \times 10^3$ | 10.4 |
| 33* | 74.950 | 0.050 | 15.000 | 10.000 | 119 | 7.5 | $8.0 \times 10^3$ | 16.4 |
| 34* | 69.950 | 0.050 | 15.000 | 15.000 | 153 | 5.6 | $6.0 \times 10^3$ | 24.9 |

*Comparison sample

As shown by EXAMPLES 13 through 17, in a case $Ta_2O_5$ with its added value of 0.005–10.000 mol % and small amount of $Nb_2O_5$ contributes to reduce specific resistance of the reduced fired body, and by re-firing in air it shows baristor characteristics.

Herein, the amount of $Nb_2O_5$ was that of impurity naturally included in starting material $TiO_2$, and was in a range of 0.001–0.200 mol % as a result of analysis.

Though for semiconductorization of $SrTiO_3$, $Ta_2O_5$ is more effective than $Nb_2O_5$, the effect of $Ta_2O_5$ is not damaged even in the case wherein $Nb_2O_5$ is contained at the same time. Accordingly, even when $Ta_2O_5$ and $Nb_2O_5$ are used at the same time as accelerating agent for semicondoctorization, it is possible to produce the baristor characteristics.

However, in the case when $Ta_2O_5$ and $Nb_2O_5$ only are added, the electric barrier formed at the grain boundaries is low, and the baristor characteristics are relatively small.

Therefore, when such additive as CdO, BaO, $La_2O_3$, $Y_2O_3$, $Gd_2O_3$ or the like is added, the added substance is segregated at the crystal granule boundaries during the reducing firing, and by re-firing in the air these additives contribute to make the crystal grain boundaries in high resistance, and the baristor characteristics become greater.

Besides, since only the crystal grain boundaries only becomes high resistance, capacitance characteristic is presented between crystal grain-crystal grain boundary-crystal grain.

Accordingly, by adding $Ta_2O_5$, $Nb_2O_5$ and such additive as CdO, BaO, $La_2O_3$, $Y_2O_3$, or $Gd_2O_3$ to $SrTiO_3$, it is possible to provide characteristics combining the baristor characteristics and the capacitance characteristics. The case such effect is presented is within a range that $Ta_2O_5$ is 0.005–10.000 mol %, $Nb_2O_5$ is 0.001–0.200 mol %, CdO, BaO, $La_2O_3$, $Y_2O_3$, or $Gd_2O_3$ is 0.005–10.000 mol %.

Though in the above-mentioned EXAMPLES 25–31, the cases where an additive is added in a single one, it was confirmed that even when in place of the above-mentioned, an oxide of Ca, In, Cs, Sn, Sb, W, Pt, Tl, Eu, Tb, Tm, Lu, Th, Ir, Os, Hf and Ru as single one in a range of the above-mentioned predetermined amount was added, the similar effect was obtained.

Besides, it was confirmed that the same effect was obtained even when two kinds or more of oxides of these Ca, Cd, In, Ba, La, Y, Cs, Sn, Sb, W, Pt, Tl, Eu, Gd, Tb, Tm, Lu, Th, Ir, Os, Hf and Ru were used in a manner that total added amount is within the above-mentioned range.

When electrodes were provided by conductive material such as Ag or thus obtained element, and a noise filter shown in FIG. 4 was constituted therewith, and noise input A shown in FIG. 5 was impressed thereon, an output of the same characteristics as that of the noise output B was obtained.

As is apparent from this, the noise is sufficiently eliminated, and also by combining the element unit and the coil the number of component is reduced, and miniaturization becomes possible.

POSSIBLE UTILIZATION IN INDUSTRY

As has been elucidated, according to the voltage-dependent non-linear resistance ceramic composition, absorption of surge impressed on the electric and electronic apparatuses and elimination of noise can be done by a single element, and it has many functions and can be miniaturized and is indispensable for protection of semiconductor product of the electric and electronic apparatuses, and practical utility thereof is extremely great.

We claim:

1. A voltage-dependent non-linear resistance ceramic composition comprising 80.000–99.990 mol % of $SrTiO_3$ and 0.005–10.000 mol % of $Dy_2O_3$ and 0.005–10.000 mol % in the form of oxides of at least one element selected from the group consisting of Ca, Cd, In, Ba, Cs, Zr, Sn, Ni, Fe, Pt, Tl, Si, Be, Li, Ir, Os, Hf and Ru.

2. A voltage-dependent non-linear resistance ceramic composition,
    which comprises
    79.800–99.989 mol % of $SrTiO_3$, 0.005–10.000 mol % of $Dy_2O_3$, 0.001–0.200 mol % of $Nb_2O_5$ and 0.005–10.000 mol % in the form of oxide(s) of one or more element selected from the group consisting of Ca, Cd, In, Ba, Cs, Zr, Sn, W, Ni, Fe, Pt, Tl, Si, Be, Li, Ir, Os, Hf and Ru.

* * * * *